US011388966B2

(12) United States Patent
Balmer et al.

(10) Patent No.: US 11,388,966 B2
(45) Date of Patent: Jul. 19, 2022

(54) DEVICE CASE WITH STRAP CONFIGURABLE FOR USE WITH ACCESSORIES

(71) Applicant: Vitec Holdings Italia SRL, Cassola (IT)

(72) Inventors: Noah Balmer, Santa Rosa, CA (US); Hen-Li Philip Chao, Livingston, NJ (US)

(73) Assignee: Yitec Imaging Solutions S.P.A., Cassola (IT)

( * ) Notice: Subject to any disclaimer, the term of this patent is extended or adjusted under 35 U.S.C. 154(b) by 157 days.

(21) Appl. No.: 16/932,071

(22) Filed: Jul. 17, 2020

(65) Prior Publication Data

US 2021/0059371 A1  Mar. 4, 2021

Related U.S. Application Data

(60) Provisional application No. 62/876,036, filed on Jul. 19, 2019.

(51) Int. Cl.
*A45C 11/00* (2006.01)
*A45C 15/00* (2006.01)
*H04M 1/04* (2006.01)
*H04B 1/3827* (2015.01)

(52) U.S. Cl.
CPC .............. *A45C 11/00* (2013.01); *A45C 15/00* (2013.01); *A45C 2011/002* (2013.01); *A45F 2200/0516* (2013.01); *H04B 2001/3861* (2013.01); *H04M 1/04* (2013.01)

(58) Field of Classification Search
CPC .............. H04M 1/04; H04B 2001/3861; A45F 2200/0516; A45C 2011/002; A45C 15/00
USPC ......................................................... 224/217
See application file for complete search history.

(56) References Cited

U.S. PATENT DOCUMENTS

| D547,062 S   | * | 7/2007  | Chang ........................... D3/247   |
|--------------|---|---------|-------------------------------------------|
| 8,297,440 B2 | * | 10/2012 | Schmidt ................. F16M 11/10       |
|              |   |         | 206/320                                   |
| D679,701 S   | * | 4/2013  | Adelman ..................... D14/253      |
| 8,833,620 B2 | * | 9/2014  | Interdonato ............... A45F 5/00      |
|              |   |         | 224/217                                   |
| 9,174,781 B2 | * | 11/2015 | Case .................. B29C 45/14565      |
| 9,185,954 B2 | * | 11/2015 | Cheung ................ H04B 1/3877        |
| D794,007 S   | * | 8/2017  | Zhang .......................... D14/250   |
| D817,316 S   | * | 5/2018  | Srour .......................... D14/251   |
| 10,001,243 B2| * | 6/2018  | Cavalcante ............ H04B 1/385         |

(Continued)

*Primary Examiner* — Justin M Larson
(74) *Attorney, Agent, or Firm* — Michael A. Guth

(57) ABSTRACT

A device case with a strap adapted to allow the user to hold an electronic device with the aid of a strap. The device case is adapted to receive an electronic device, such as a cellular telephone, with a case with rimmed sides that capture the electronic device. The strap may unclip and move along a fixed path, exposing a clip adapted to be received by a clip receiver, such as on a tripod. An attachable device strap adapted to be adhesively fastened to the back side of an electronic device, such as a cellular telephone, or to the back side of a case holding a cellular telephone. The strap may unclip and move along a fixed path, exposing a clip adapted to be received by a clip receiver, such as on a tripod. Accessories such as stands, holders, and lights may be couple to the exposed clip, adding other functionalities to the case system.

20 Claims, 42 Drawing Sheets

(56) References Cited

U.S. PATENT DOCUMENTS

| | | | | |
|---|---|---|---|---|
| 10,063,272 B1 | * | 8/2018 | Yeo | A45F 5/00 |
| 10,349,728 B2 | * | 7/2019 | Yoo | A45F 5/00 |
| D863,287 S | * | 10/2019 | Srour | D14/251 |
| D864,188 S | * | 10/2019 | Che | D14/253 |
| 10,463,126 B2 | * | 11/2019 | Mallory | A45F 5/00 |
| 10,549,895 B2 | * | 2/2020 | Case | B65D 63/04 |
| D877,154 S | * | 3/2020 | Hummel | D14/447 |
| 10,610,004 B1 | * | 4/2020 | Yeo | A45C 11/182 |
| 10,623,543 B2 | * | 4/2020 | Hummel | H04B 1/3877 |
| D883,272 S | * | 5/2020 | Park | D14/253 |
| 10,694,837 B1 | * | 6/2020 | Altschul | H04M 1/04 |
| D894,167 S | * | 8/2020 | Feller | D14/251 |
| D894,889 S | * | 9/2020 | Feller | D14/251 |
| D905,040 S | * | 12/2020 | Altschul | H04B 1/3888 |
| | | | | D14/251 |
| D916,073 S | * | 4/2021 | Li | D14/253 |
| 11,058,194 B2 | * | 7/2021 | Mora | H04M 1/21 |
| 11,181,227 B1 | * | 11/2021 | Pontecorvo | F16M 11/38 |
| 11,211,963 B1 | * | 12/2021 | Cunningham | H04M 1/04 |
| 2010/0294908 A1 | * | 11/2010 | Mish | F16M 11/041 |
| | | | | 248/454 |
| 2014/0332418 A1 | * | 11/2014 | Cheung | H04B 1/3877 |
| | | | | 206/45.2 |
| 2015/0335138 A1 | * | 11/2015 | Juarbe | H04M 1/04 |
| | | | | 224/218 |
| 2016/0172883 A1 | * | 6/2016 | Globerson | A45C 11/00 |
| | | | | 320/115 |
| 2019/0055062 A1 | * | 2/2019 | Winn | H04B 1/3888 |
| 2020/0093231 A1 | * | 3/2020 | Mora | A45C 13/1069 |
| 2020/0297087 A1 | * | 9/2020 | Mora | F16M 13/005 |
| 2021/0059371 A1 | * | 3/2021 | Balmer | F16M 13/04 |
| 2021/0153635 A1 | * | 5/2021 | Vasquez | G06F 1/1628 |
| 2021/0282513 A1 | * | 9/2021 | Mora | F16M 11/041 |

* cited by examiner

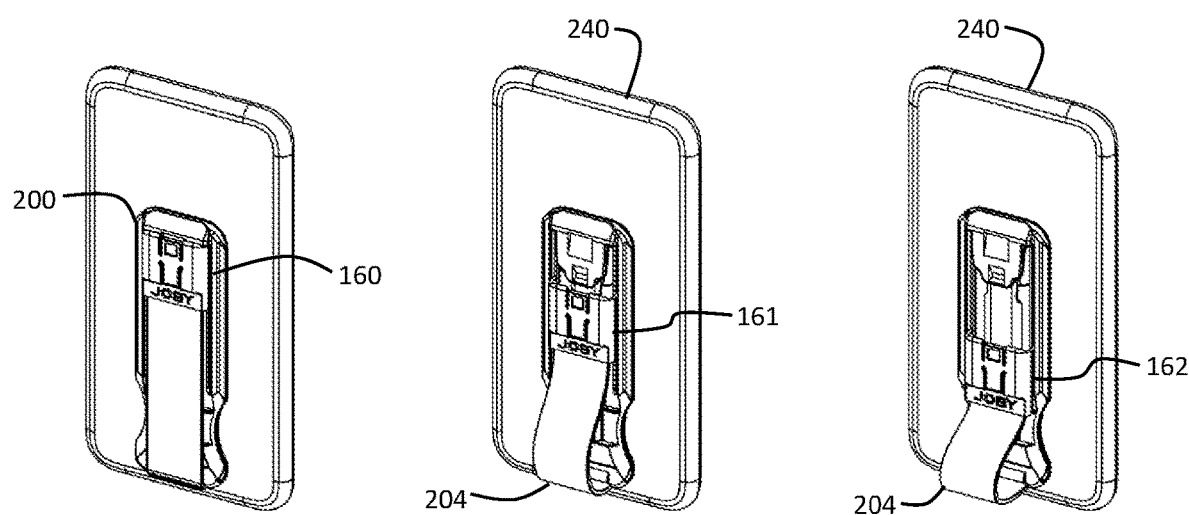
FIGUREE 11

DEVICE CASE WITH STRAP CONFIGURABLE FOR USE WITH ACCESSORIES

CROSS-REFERENCE TO RELATED APPLICATIONS

This application claims priority to U.S. Provisional Patent Application No. 62/876,036 to Balmer, filed Jul. 19, 2019, which is hereby incorporated by reference in its entirety.

BACKGROUND

Field of the Invention

The present invention relates to accessories for an electronic device, and more particularly to a strap unit with attachment for attaching the device to a tripod.

Description of Related Art

Cases for electronic devices such as cellular telephones are adapted to protect the device from environmental hazards, as well as scuffing and other types of wear. A user may want to have a case which allows for additional security in the holding of the device. Also, users may want to be able to support other accessory items, and may want to have them attached to the telephone, or to its case.

What is called for is a device case which can provide a more secure way to hold the device, such as a cellular telephone, and which can support accessories.

BRIEF DESCRIPTION OF THE DRAWINGS

FIG. 11 is a series of views of an attachable device strap system on a cellular telephone in different configurations according to some embodiments of the present invention.

SUMMARY OF THE INVENTION

Figure 1A:
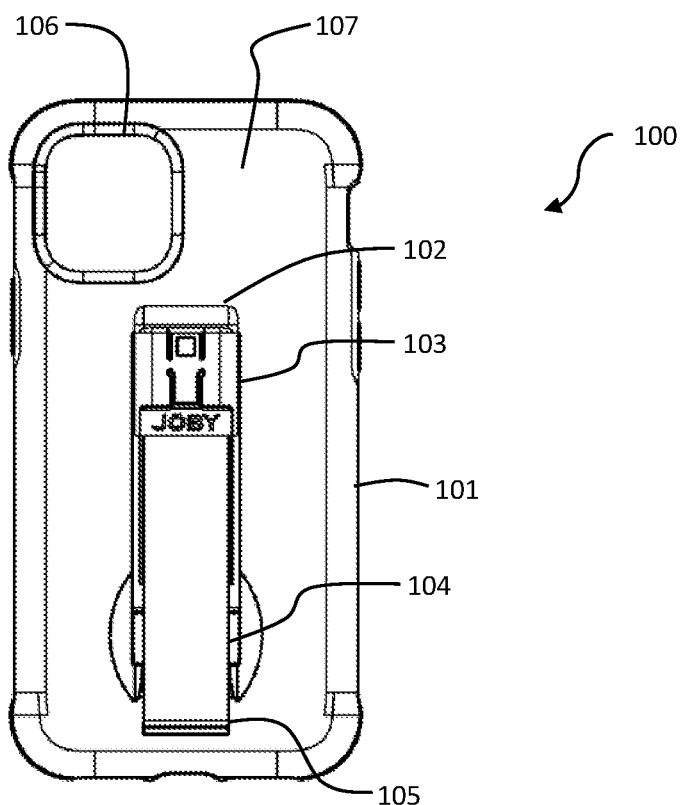
FIG. 1A is a front view of a device case with strap according to some embodiments of the present invention.

A device case with a strap adapted to allow the user to hold an electronic device with the aid of a strap. The device case is adapted to receive an electronic device, such as a cellular telephone, with a case with rimmed sides that capture the electronic device. The strap may unclip and move along a fixed path, exposing a clip adapted to be received by a clip receiver, such as on a tripod. An attachable device strap adapted to be adhesively fastened to the back side of an electronic device, such as a cellular telephone, or to the back side of a case holding a cellular telephone. The strap may unclip and move along a fixed path, exposing a clip adapted to be received by a clip receiver, such as on a tripod. Accessories such as stands, holders, and lights may be couple to the exposed clip, adding other functionalities to the case system.

DETAILED DESCRIPTION

FIGS. 1A-1H illustrate a device case with strap 100 according to some embodiments of the present invention. The device case with strap 100 has a main case 101 adapted to receive an electronic device, such as a cellular telephone, on a first side 108. The main case 101 has a strap and clip assembly on a second side 107. The case 101 has a case clip 102 coupled to the second side 107. In some aspects, the main case 101 is adapted to gently snap over a device, such as a cellular telephone, and to retain that device within the case. The main case 101 may provide scuff and impact protection in addition to providing the functionalities of the strap, and of the clip-on accessories, as discussed below.

The device case with strap provides the user a strap to have additional stability and safety when holding a device, such as a cellular telephone. The strap provides a finger loop through which the user can place a finger or fingers, enhancing the security of holding the device. The strap may extend into a loop in an open configuration, but may be pulled flat against the device case when in a closed configuration, allowing for a more streamlined configuration, which may be desired while the device is in a pocket, for example. Additionally, in the open configuration, a clip plate may be accessible which allows the user to clip on one of a number of different accessories, such as lights, speakers, supports, or to further clip the device case to a support unit such as tripod.

Figure 1B:
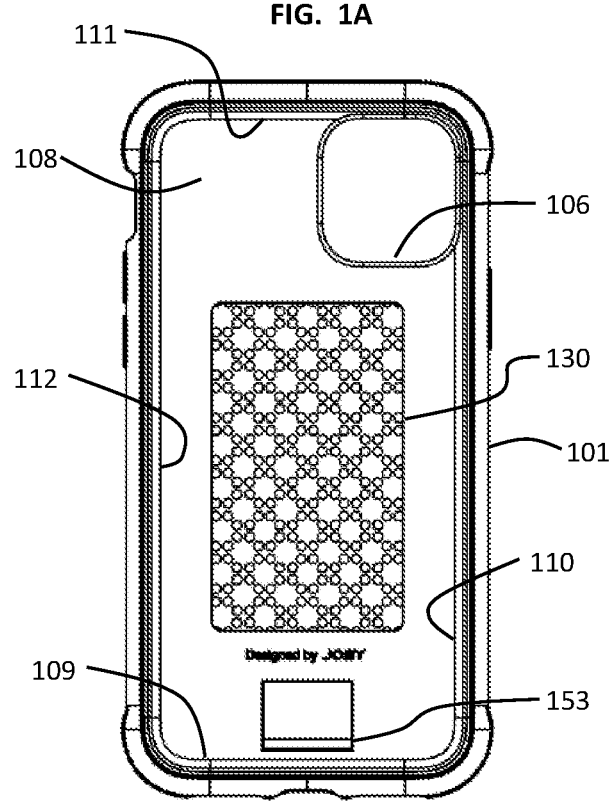
FIG. 1B is a back view of a device case with strap according to some embodiments of the present invention.
Figure 1C:
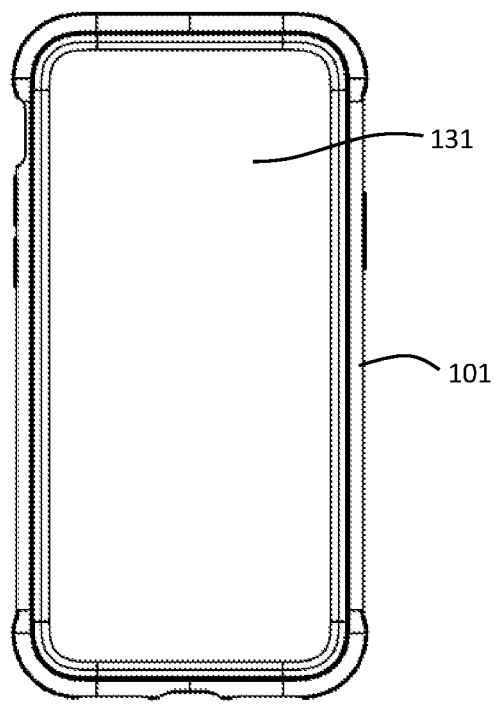
FIG. 1C is a back view of a device case with strap with device according to some embodiments of the present invention.
Figure 1D:
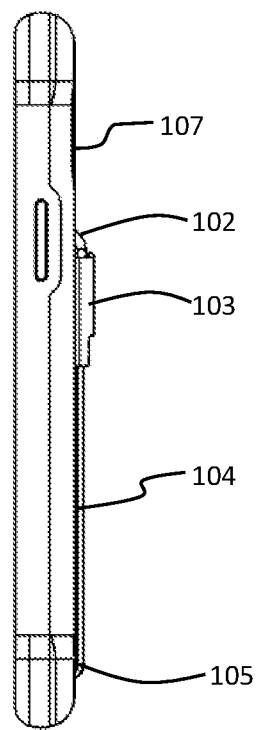
FIG. 1D is a side view of a device case with strap according to some embodiments of the present invention.
Figure 1E:
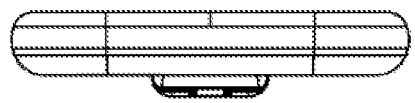
FIG. 1E is a bottom view of a device case with strap according to some embodiments of the present invention.
Figure 1F:
FIG. 1F is a top view of a device case with strap according to some embodiments of the present invention.

FIG. 1B illustrates the device case with strap 100 where the main case 101 does not have the telephone mounted therein. The main case 101 has a central panel which then may have a bottom rim 109, side rims 110, 112, and a top rim 111 adapted to retain an electronic device. In aspects, the rims may deflect slightly to receive the electronic device and then lock around the electronic device. A cover 130 may be used to provide a continuous inner surface to the first side 108 of the case. In order to manufacture, which may include molding, the rails of the case 101 which allow for the sliding of the strap clip slider, there may be a void in the inner surface of the case. The molding may only support a single solid layer, which may be the strap clip slider. The cover 130 may be placed cover the void in the continuity of the inner surface of the first side 108 of the case 101.

A strap clip slider 103 is clipped into the case clip 102 in the closed configuration seen in FIG. 1A. A strap 104 is coupled to the strap clip slider 103 on a first end and is coupled to the strap base on a second end 105. The strap 104 may enter the case 101 from the rear through a slot 153. The strap 104 may then be fastened to the inside surface of the first side 108 of the case 101. In some aspects, one or more holes 106 may be present in the main case 101 to allow for functionalities of the electronic device held by the device case with strap 100.

FIGS. 1C-1F illustrate the device case with strap 100 with a cellular telephone 131 mounted within the case 101 and with the strap clip slider 103 clipped into the case clip 102. In this configuration, the strap 104 is pulled somewhat tightly and lays against the second side 107 of the case 101. In addition to the hole 106 which may allow clearance for a camera within the cellular telephone, other holes in the case may be present to provide access to buttons and ports on the cellular telephone. It should be understood that the front of the cellular telephone, which may be a smartphone screen, is seen at the back of the device case, as described herein.

Figure 1G:
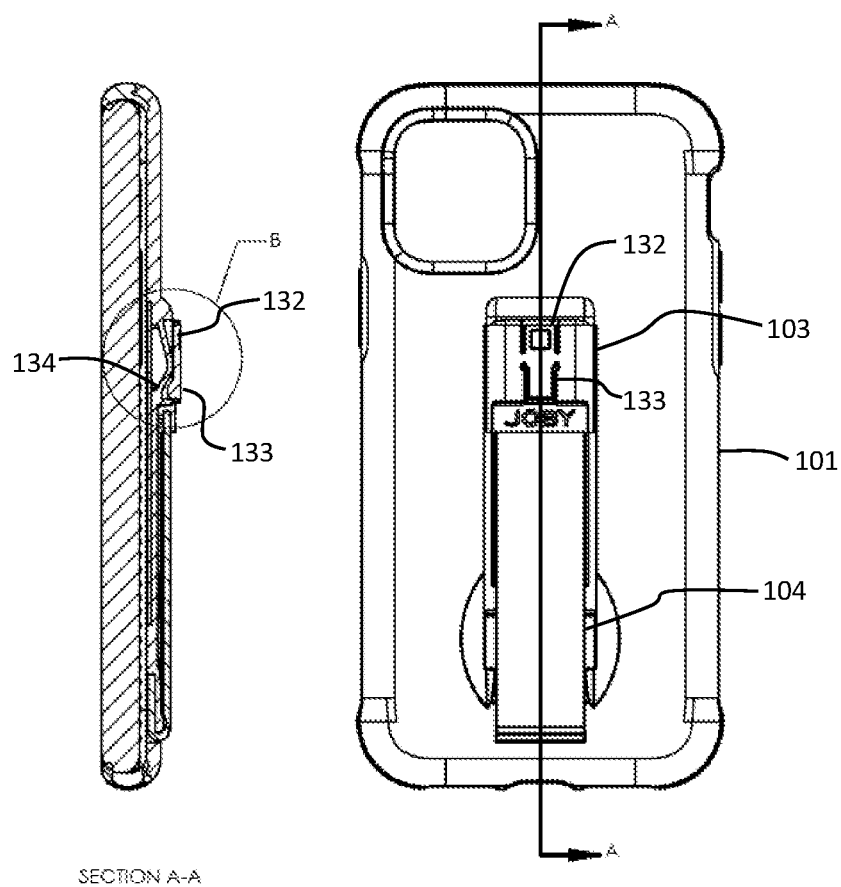
FIG. 1G is a cross-sectional view of a device case according to some embodiments of the present invention.
Figure 1H:
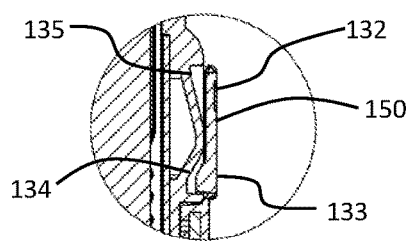
FIG. 1H is a partial cross-sectional view of a latch in a latched configuration according to some embodiments of the present invention.
Figure 1I:
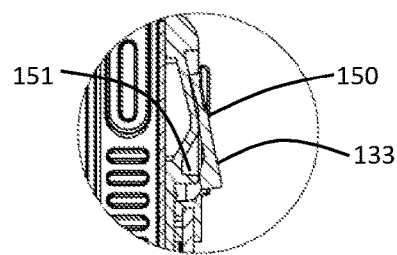
FIG. 1I is a partial cross-sectional view of a latch in an unlatched configuration according to some embodiments of the present invention.

FIGS. 1G-1I illustrate the latching and release aspects of the strap clip slider 103 to the case clip 102. A push tab 132 may be pressed down, or toward the case, and this will cause an upward pivot of the latch 133. The push tab 132 and the latch 133 may be considered to be a pivoting unit 150, with or without a pivot pin. The push tab 132 and the latch 133 may be cut apart from the strap clip slider structure in such a manner that the depressing of the push tab 132 will raise the latch 133, acting as a pivoting unit 150. The pivoting unit 150 may operate as if it is a spring loaded pivot, but may only use the material properties of the material, and the configuration of how the push tab and latch are cut out of the clip slider, to achieve that functionality. The latch 133 resides within a recess 134 in the clip 102, and when the latch 133 is upwardly pivoted it will free the strap clip slider and allow it to slide along the slider rails 155. FIG. 1I illustrates the pivoting unit 150 in a depressed position, wherein the latch 133 is raised above the capture surface 151 of the recess 134, allowing for the release of the strap clip slider 103.

Figure 1J:
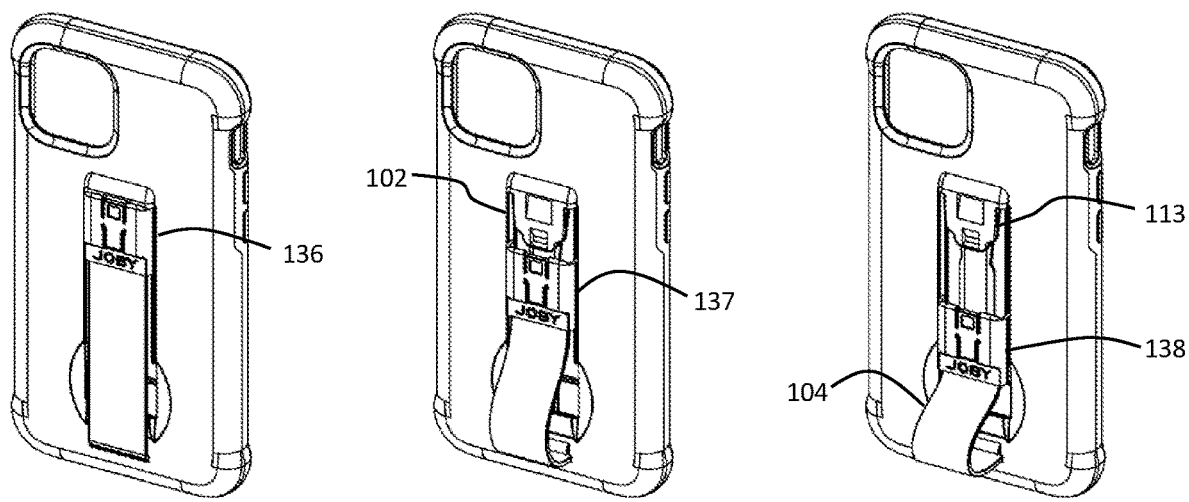
FIG. 1J is a series of views of the device case with clip in a plurality of configurations according to some embodiments of the present invention.

FIG. 1J illustrates the strap clip slider 102 in first a closed configuration 136, then in a partially open configuration 137 with the strap 104 starting to bow out, and then in a fully open configuration 138 with the strap now bowed out to a maximum extent. The clip plate 113

Figure 2A:
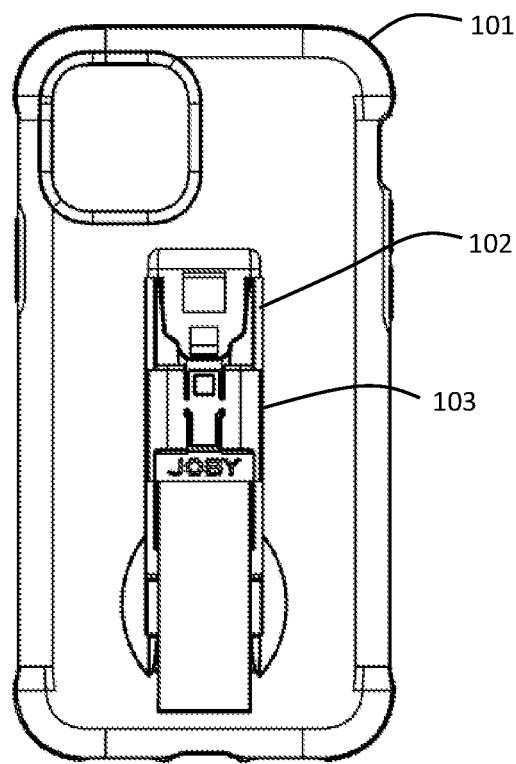
FIG. 2A is a front view of a device case with strap in a partially open configuration according to some embodiments of the present invention.
Figure 2B:
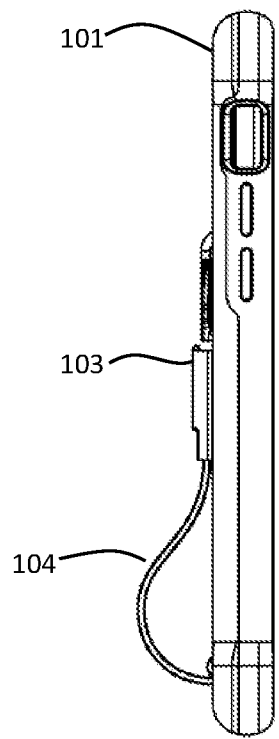
FIG. 2B is a side view of a device case with strap in a partially open configuration according to some embodiments of the present invention.
Figure 3A:
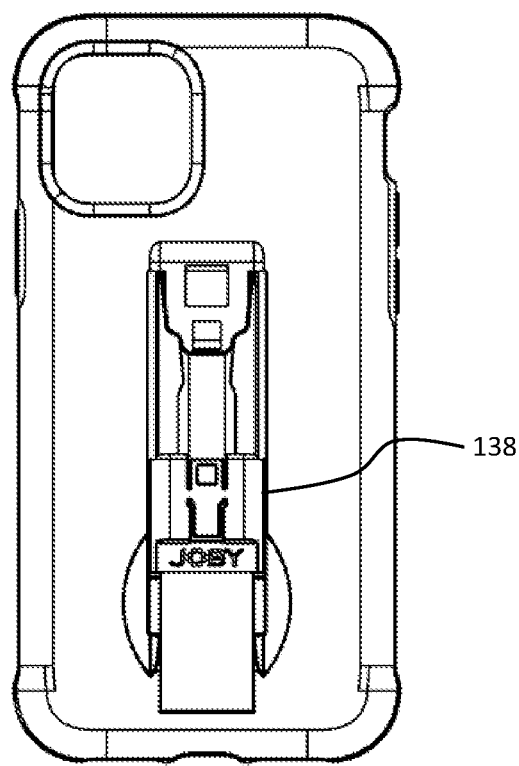
FIG. 3A is a front view of a device case with strap in a fully open configuration according to some embodiments of the present invention.
Figure 3B:
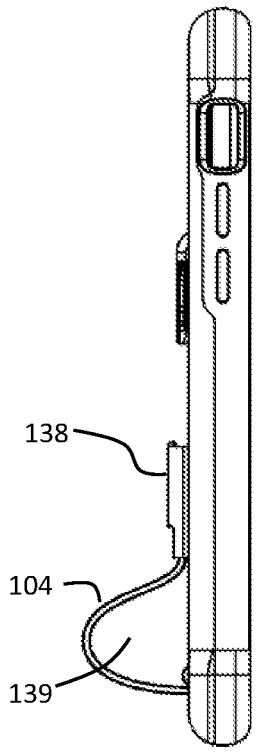
FIG. 3B is a side view of a device case with strap in a fully open configuration according to some embodiments of the present invention.

FIGS. 2A and 2B illustrate the partially open configuration 137 of the strap clip slider, with the strap 104 partially bowed outward. FIGS. 3A and 3B illustrate the fully open configuration 138 with the strap bowed out to a maximum extent. The bowed out strap allows the user to grasp the device case, with the device mounted therein, and to get extra hold and security by running one or more fingers under the bowed out strap. By grasping the device and case while using one or more fingers through the strap bow, the user greatly reduces, or eliminates, the risk that the device case might be dropped. The use of the strap in this manner may also allow for a more steady holding of the device during photography or videography. The use of the strap in this manner also enhances the user's control during normal phone use, including telephoning, and viewing the smartphone screen.

Figure 3C:
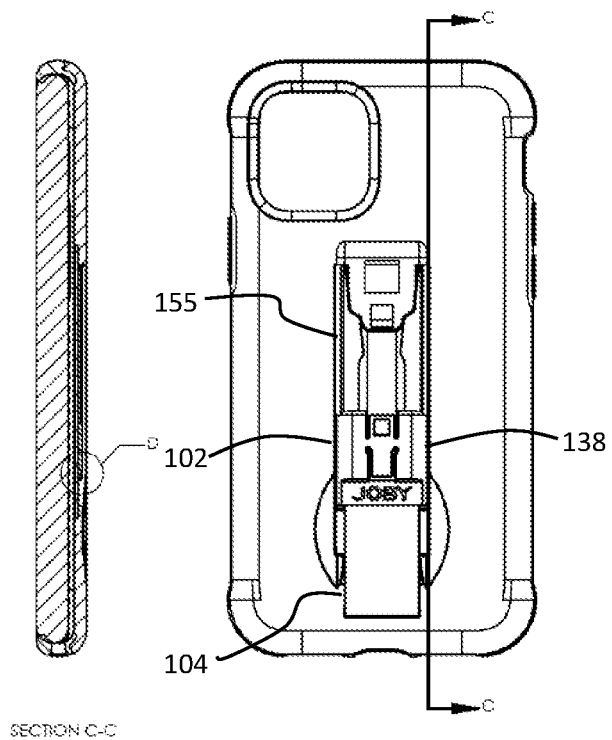
FIG. 3C presents a sectional view of a device case with strap in a fully open configuration according to some embodiments of the present invention.
Figure 3D:
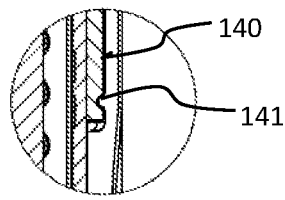
FIG. 3D is a cross-sectional view of a recess according to some embodiments of the present invention.
Figure 3E:
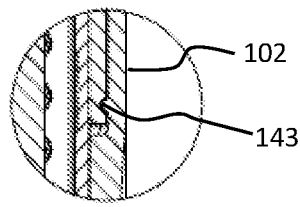
FIG. 3E is a cross-sectional view of a recess with extrusion according to some embodiments of the present invention.
Figure 4A:
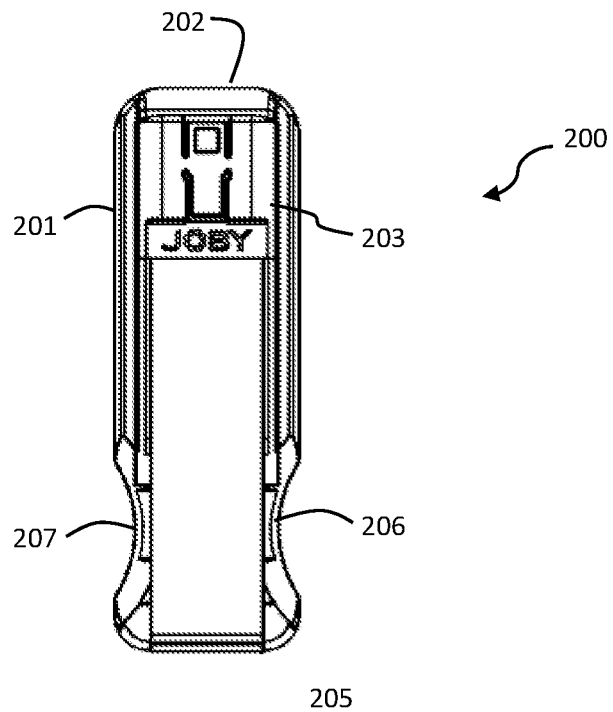
FIG. 4A is a front view of an attachable device strap system according to some embodiments of the present invention.
Figure 4B:
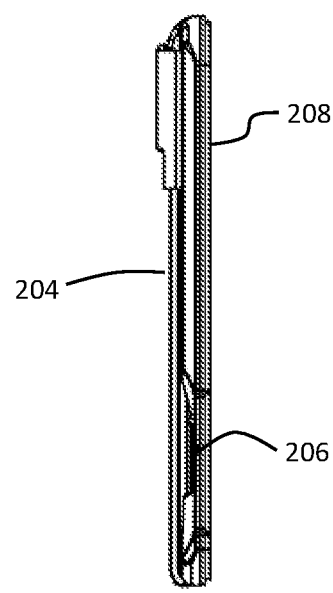
FIG. 4B is a side view of an attachable device strap system according to some embodiments of the present invention.
Figure 4C:
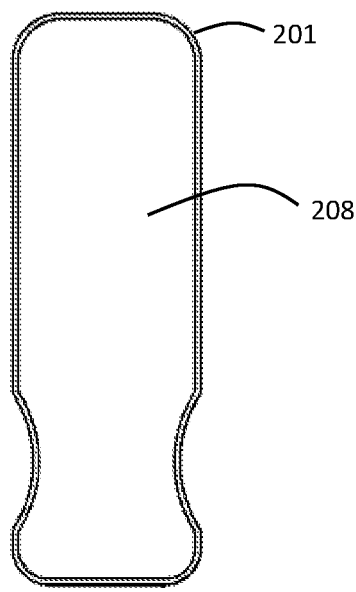
FIG. 4C is a rear view of an attachable device strap system according to some embodiments of the present invention.
Figure 4D:
FIG. 4D is a top view of an attachable device strap system according to some embodiments of the present invention.
Figure 4E:
FIG. 4E is a bottom view of an attachable device strap system according to some embodiments of the present invention.

As seen in FIG. 3C, a rail structure 155 may include slots which provide a guide to the sliding strap clip slider 102. The strap clip slider 102 may include rail portions which extend down through the slots. The slots with their mating rails allow for the axial movement of the strap clip slider 102 as it moves from a closed configuration to an open configuration, as well as maintaining its orientation. The rails my include lips which tuck under the rail structure in order to retain the strap clip slider 102 onto the rail structure 155. In addition, the rail structure 155 may have a recess 141 along its top surface 140. The recess 141 is adapted to receive a bump, or extrusion, 143 on the underside of the strap clip slider 102 to gently lock the slider in the fully open configuration 138. The recess 141 may receive the extrusion 143 with a gentle interference fit which will gently lock the slider into an open position, but be easily unlocked by the user when desired.

The sliding of the strap clip slider 103 exposes a mating clip plate 113 which may allow for the device case with strap 100 to be clipped into a clip receiver on a tripod or other mounting device. In some aspects, the mating clip plate 113 may a raised planar piece which is undercut around its front and side perimeters, allowing it to slide into a clip receiver which has a floor circumscribed with a lipped sides and rear. The mating clip plate 113 may also mate to a variety of accessory components with a clip receiver, as discussed further below.

FIGS. 4A-4E illustrate an attachable device strap system 200 according to some embodiments of the present invention. The attachable device strap 200 has a main structure 201 adapted to be adhesively coupled to an electronic device, such as a cellular telephone, on a first side 208 of the attachable device strap system 200. The main structure 201 has a strap and clip assembly on a second side. The main structure 201 has a case clip 213 coupled to the second side of the main structure 201. A strap clip slider 203 is clipped into the case clip 213 in the closed configuration seen in FIGS. 4A-4E. A strap 204 is coupled to the strap clip slider 203 on a first end and is coupled to the strap base 205 on a second end. Strap access areas 206, 207 are inset areas adapted to allow the user better access to slip a finger under the strap 204. An adhesive may be affixed to the back surface 208 of the main structure 201 for mounting onto an electronic device, such as a cellular telephone.

Figure 5A:
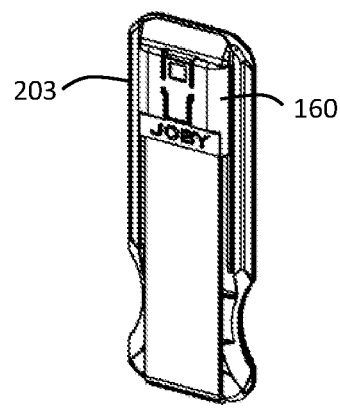
FIG. 5A is a view of an attachable device strap system in a closed configuration according to some embodiments of the present invention.
Figure 5B:
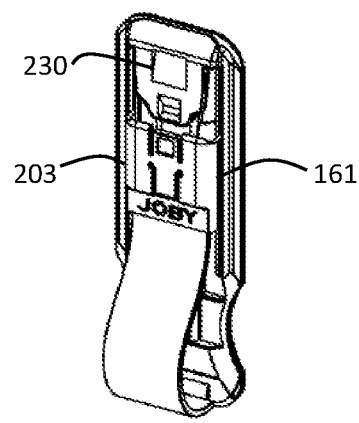
FIG. 5B is a view of an attachable device strap system in a partially open configuration according to some embodiments of the present invention.
Figure 5C:
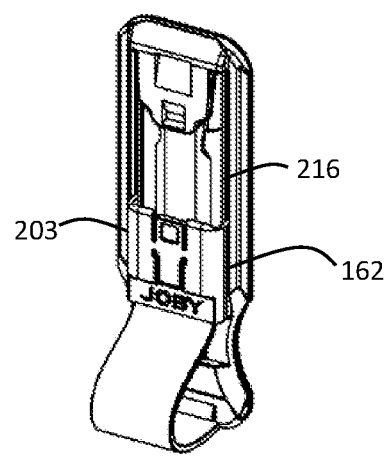
FIG. 5C is a view of an attachable device strap system in a fully open configuration according to some embodiments of the present invention.

FIGS. 5A through 5C illustrate the attachable device strap system 200 in series of configurations including closed 160, partially open 161, and a fully open 162 configuration. In the partially open and fully open configuration, the strap clip slider 203 has been unclipped from the case clip 213.

Figure 6A:
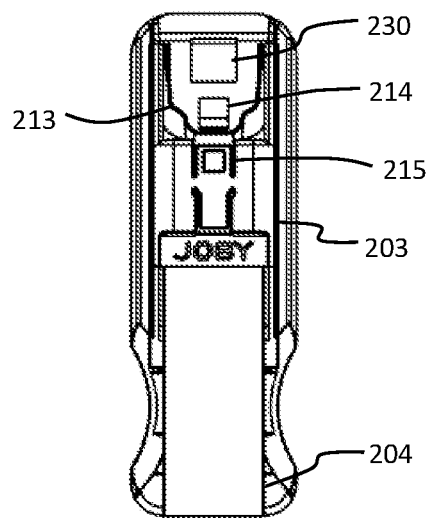
FIG. 6A is a front view of an attachable device strap system in a partially open configuration according to some embodiments of the present invention.
Figure 6B:
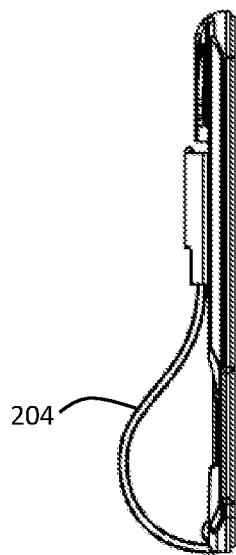
FIG. 6B is a side view of an attachable device strap system in a partially open configuration according to some embodiments of the present invention.
Figure 7A:
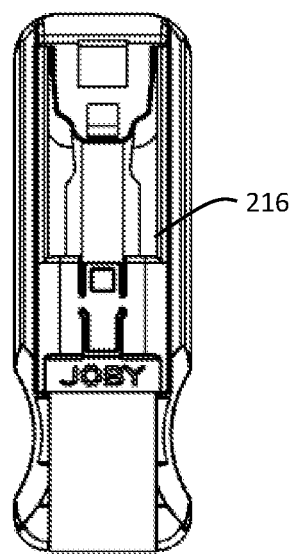
FIG. 7A is a front view of an attachable device strap system in a fully open configuration according to some embodiments of the present invention.
Figure 7B:
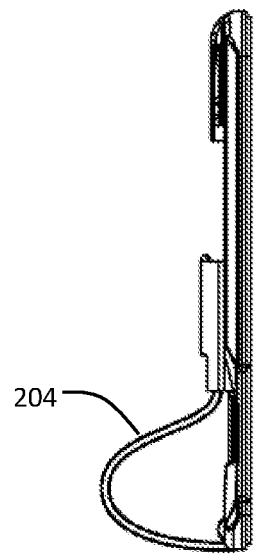
FIG. 7B is a side view of an attachable device strap system in a fully open configuration according to some embodiments of the present invention.

FIGS. 6A and 6B illustrate the partially open configuration 161 the strap clip slider, with the strap 204 partially bowed outward. FIGS. 7A and 7B illustrate the fully open configuration 162 with the strap bowed out to a maximum extent. The bowed out strap allows the user to grasp the device case, with the device mounted therein, and to get extra hold and security by running one or more fingers under the bowed out strap. By grasping the device and case while using one or more fingers through the strap bow, the user greatly reduces, or eliminates, the risk that the device case might be dropped. The use of the strap in this manner may also allow for a more steady holding of the device during photography or videography.

Figure 8A:
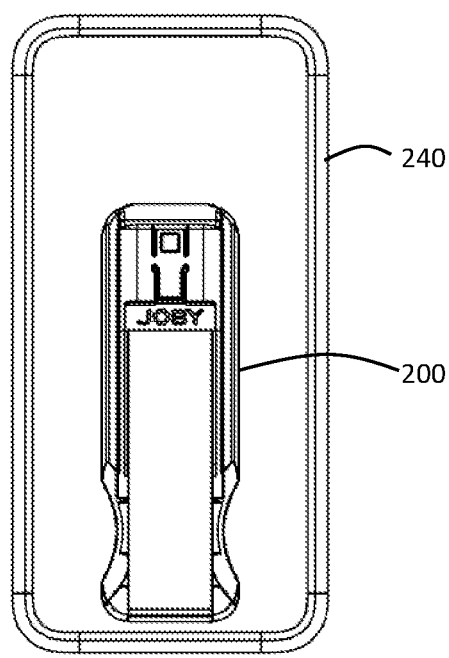
FIG. 8A is a front view of an attachable device strap system on a cellular telephone in a closed configuration according to some embodiments of the present invention.
Figure 8B:
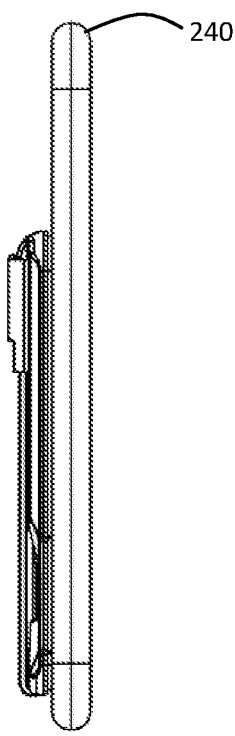
FIG. 8B is a side view of an attachable device strap system on a cellular telephone in a closed configuration according to some embodiments of the present invention.
Figure 8C:
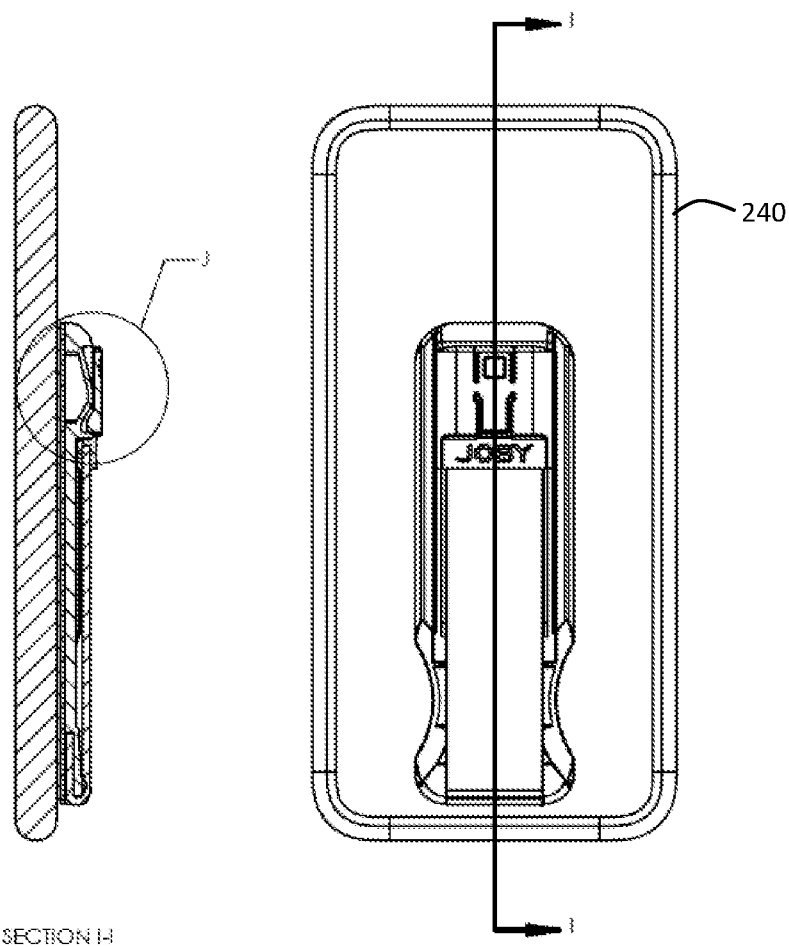
FIG. 8C is a front view and cross-sectional view of an attachable device strap system on a cellular telephone in a closed configuration according to some embodiments of the present invention.
Figure 8D:
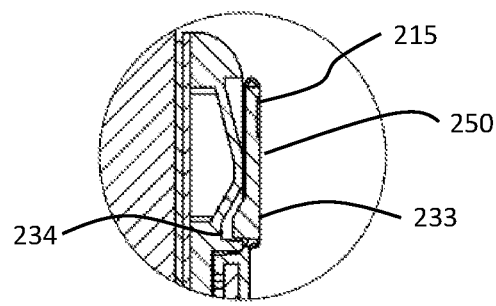
FIG. 8D is a cross-sectional view of the latch on an attachable device strap system on a cellular telephone in a closed configuration according to some embodiments of the present invention.

As seen in FIGS. 8C and 8D, the clip release push tab 215 may be depressed into a recess 230 to release the clip release from a clip capturing recess 214. The push tab 132 and the latch 233 may be considered to be a pivoting unit 250, with or without a pivot pin. The push tab 215 and the latch 233 may be cut apart from the strap clip slider structure in such a manner that the depressing of the push tab 215 will raise the latch 233, acting as a pivoting unit 250. The latch 233 resides within a recess 234 in the clip 213, and when the latch 233 is upwardly pivoted it will free the strap clip slider and allow it to slide along the slider rails 155.

The strap clip slider 203 is coupled to the second side of the main structure 201 along a sliding rail system which allows the strap clip slider 203 to move away from the case clip along the sliding rail system 216 which keeps the strap clip movably attached to the main structure 201. As the strap clip slider 203 is slid away from the case clip 213, a portion of the strap 204 may move away from the main structure 201 to create a loop.

Figure 9A:
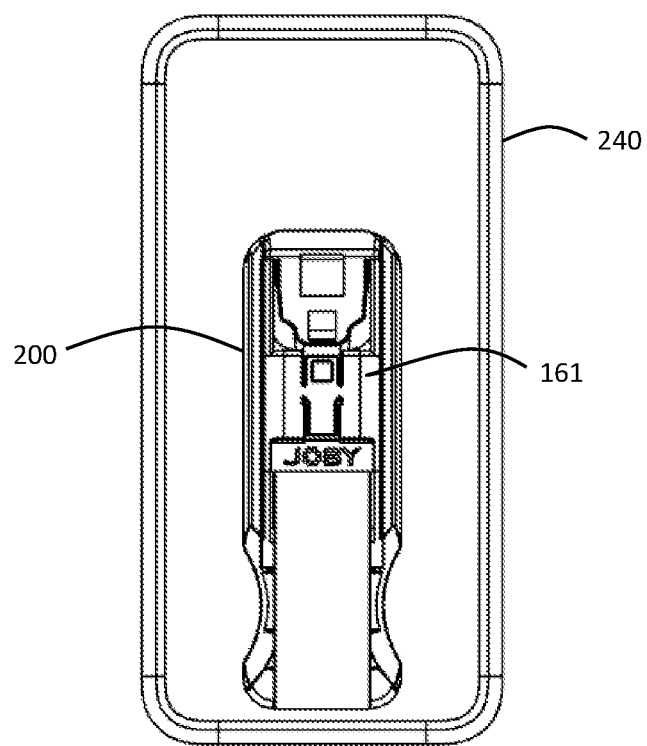
FIG. 9A is a front view of an attachable device strap system on a cellular telephone in a partially open configuration according to some embodiments of the present invention.
Figure 9B:
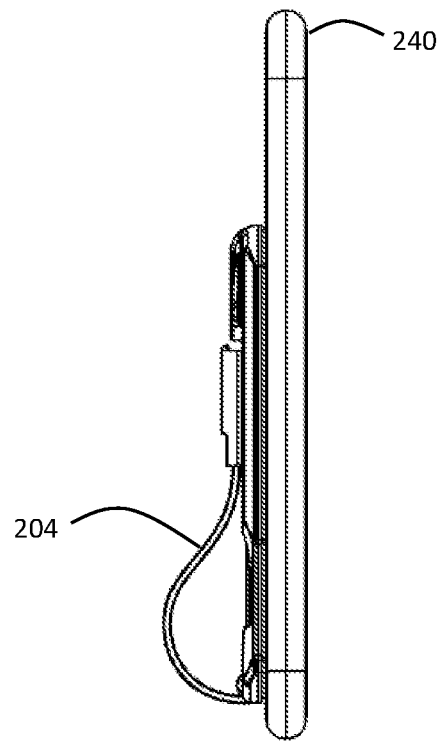
FIG. 9B is a side view of an attachable device strap system on a cellular telephone in a partially open configuration according to some embodiments of the present invention.
Figure 10A:
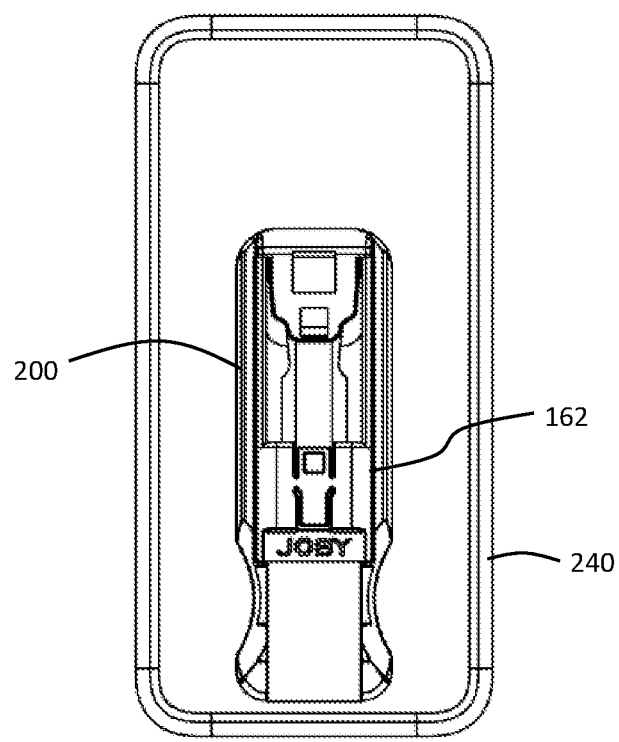
FIG. 10A is a front view of an attachable device strap system on a cellular telephone in a fully open configuration according to some embodiments of the present invention.
Figure 10B:
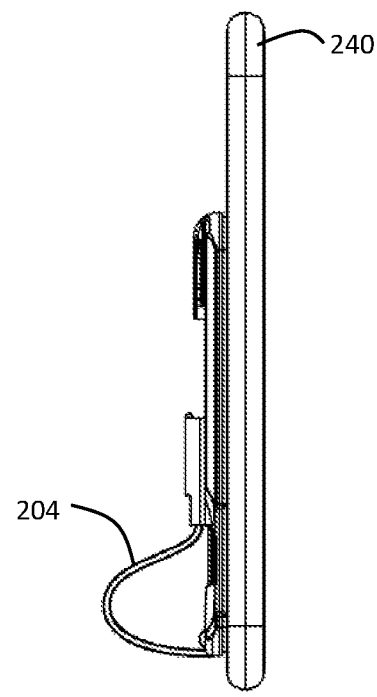
FIG. 10B is a side view of an attachable device strap system on a cellular telephone in a fully open configuration according to some embodiments of the present invention.
Figure 12A:
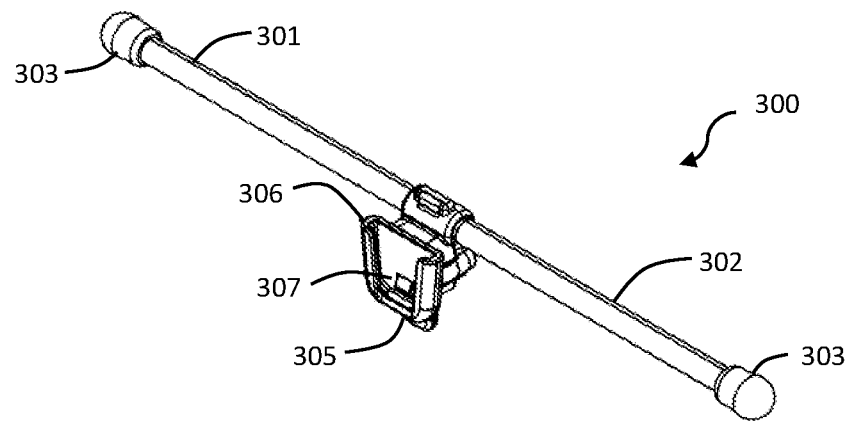
FIGS. 12A-F are views of a flexible arm assembly according to some embodiments of the present invention.
Figure 12B:
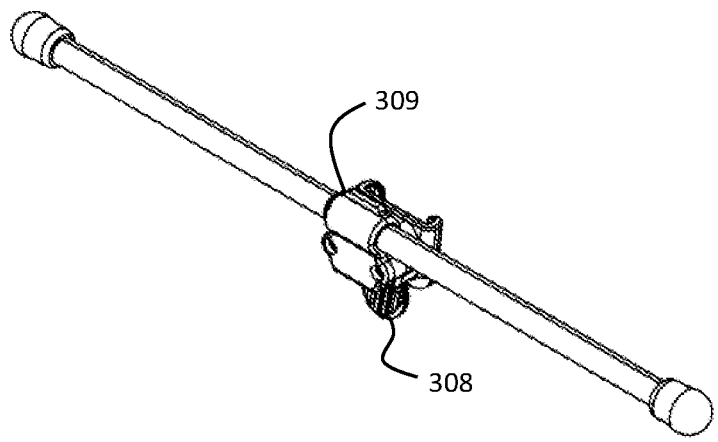
Figure 12C:
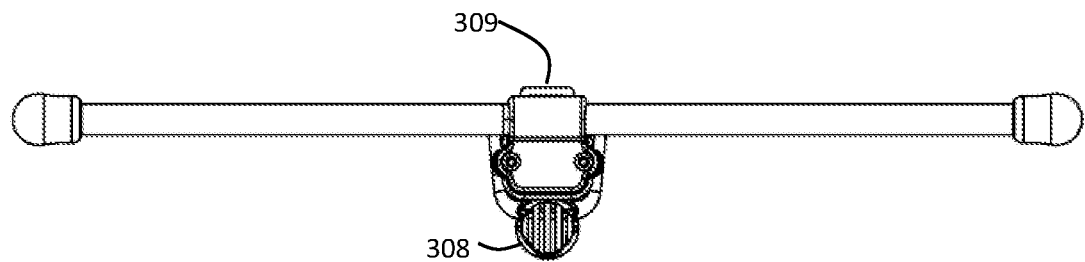
Figure 12D:
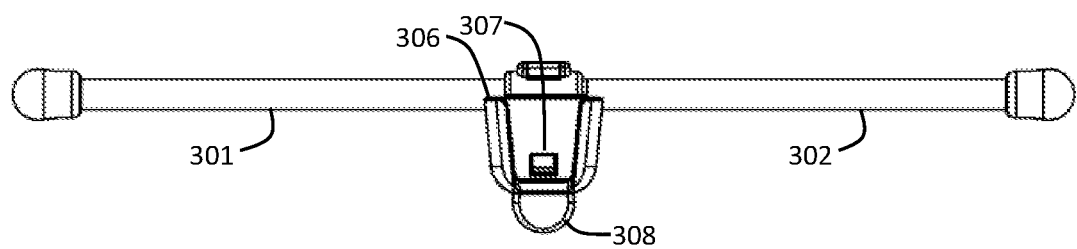
Figure 12E:
Figure 12F:
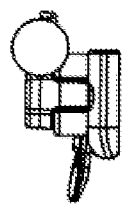

FIGS. 8A and 8B illustrate the attachable device strap system 200 attached to a cellular telephone 240 in a closed configuration 160. FIGS. 9A and 9B illustrate the attachable device strap system 200 attached to a cellular telephone 240 in a partially open configuration 161. FIGS. 10A and 10B illustrate the attachable device strap system 200 attached to a cellular telephone 240 in a fully open configuration 162. FIG. 11 illustrate the closed configuration 160, the partially open configuration 161, and the fully open configuration 162. Although illustrated in FIGS. 8A and 8B as adhered directly to a cellular telephone, the attachable device strap system may similarly be adhered to a case which supports a telephone, as opposed to directly onto the cellular telephone.

In some embodiments of the present invention, accessory items may be clipped onto the case clip 102 of the device case with strap 100 or onto the clip of the attachable device clip system 200, which may be mounted onto a cellular telephone, for example. The accessory items may include a clip receiver adapted to releasably latch onto the clip using mating interfaces.

The clip base 113, as seen in FIG. 1J, may have a flat outward surface and rails along its sides, or along three sides. The rails of the clip can be inserted into a mating interface of a clip receiver, which is adapted to receive a flat bottomed clip and which has grooves along its sides to receive the rails of the clip. A recess 134 in the planar outward surface of the clip base is adapted to receive a mating latch portion of the clip receiver. The recess 134 is adapted to allow for the capture of the clip by a tab when slid into an interfacing clip reciever of a support structure, such as an accessory item as discussed below. A neckdown on the side rails 113 allows for easier insertion of the clip into its interfacing clip receiver.

In some embodiments of the present invention, as seen in FIGS. 12A-12F, a flexible arm assembly 300 is adapted to mate to the case clip of a device case with strap or onto the clip of an attachable device clip system, or to other systems with appropriate and similar interfaces. The flexible arm assembly 300 includes a clip receiver 305 adapted to receive a clip. The clip, which may be the case clip 102 of the device case with strap 100, may have rails adapted to slide into slots 306 along the inside of the sides of the raised sides of the clip receiver.

The clip receiver 305 may be removably attached to the clip receiver and may be released by pressing on the lever 308. In some embodiments, the lever is on the same side of the clip receiver as which the clip slides in on. In other embodiments, the lever 308 is on the side opposite that which the clip slides in on. The latch 307 is adapted to releasably couple to the clip within the recess 234 of the clip surface.

A first arm 301 and a second arm 302 are coupled to the main body 309 of the flexible arm assembly 309. In some aspects, the first arm and the second arm are part of a continuous arm structure. The arms are flexible enough be bent by the user into a desired configuration, while being rigid enough to maintain that configuration during use and while supporting a cellular telephone in a device case to which the flexible arm assembly is coupled. The arms may be of an aluminum center covered with a silicone sleeve. End caps 303 may be placed on the ends of the arms and may be of a sufficiently frictional material to prevent slipping of the legs while used as described below.

Figure 13A:
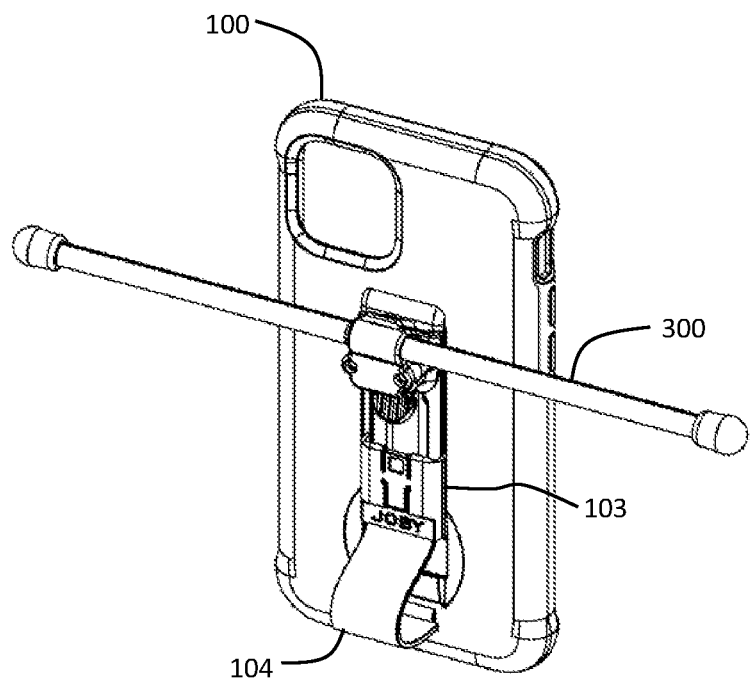
FIGS. 13A-D are views of a flexible arm assembly coupled to a device case according to some embodiments of the present invention.
Figure 13B:
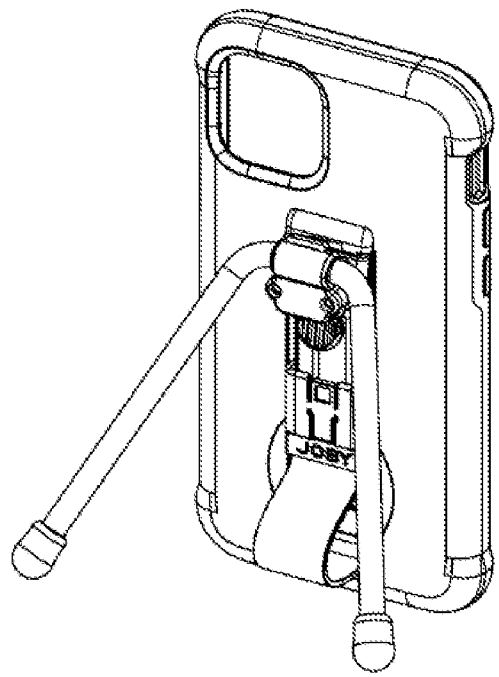
Figure 13C:
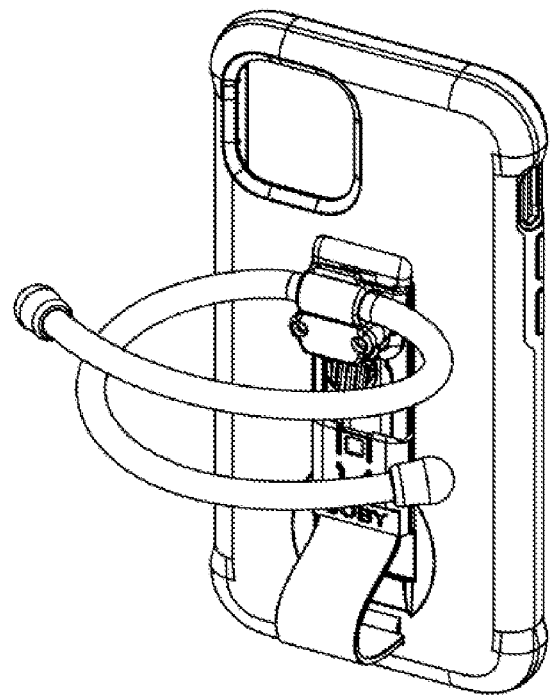
Figure 13D:
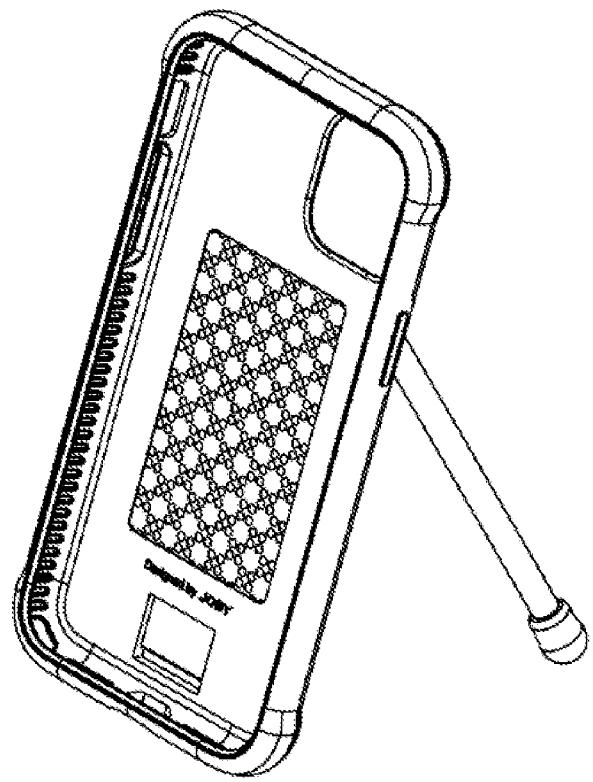

FIG. 13A illustrates the flexible arm assembly 300 coupled to a device case 100. The clip slider 103 is in the fully open configuration and the extrusion 143 is gently locked into the recess 141. The gentle locking of the clip slider in the fully open position, with the strap 104 looped out, allows more ease for the user to insert the clip receiver of the flexible arm assembly onto the clip, avoiding interference from the clip slider. FIG. 13B illustrates the flexible arms bent into a downward configuration allowing for support of the device case, for example, if placed on a flat surface. FIG. 13C illustrates the flexible arms looped into a spiral configuration, as could be used if wrapped around a pole or other structure, allowing for support of the device casein such a circumstance. FIG. 13D shows a view of the device case without a cellular telephone mounted therein, with the device supported by arms in the downward configuration.

Figure 14A:
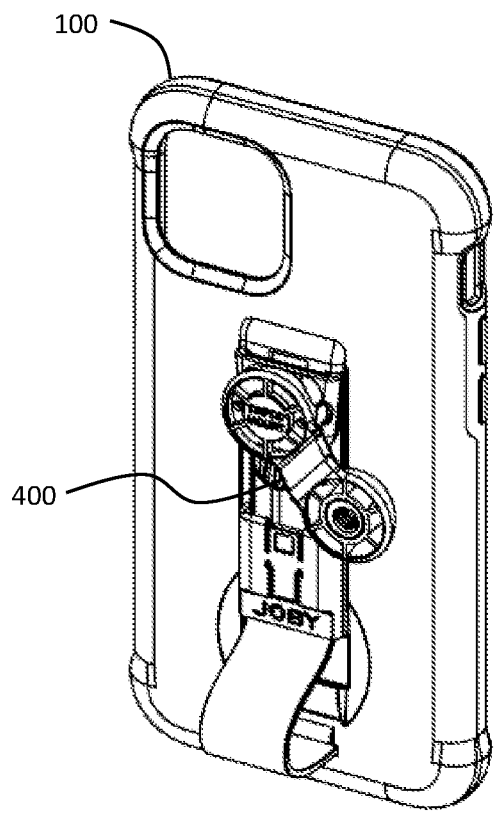
FIGS. 14A-G are views of an offset threaded adapter accessory according to some embodiments of the present invention.
Figure 14B:
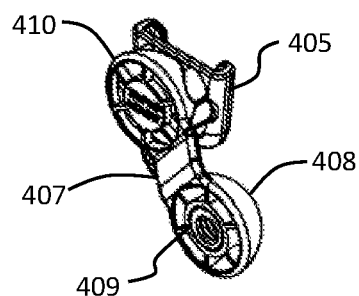
Figure 14C:
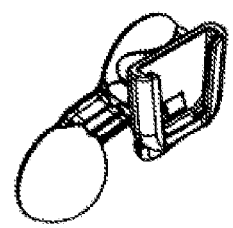
Figure 14D:
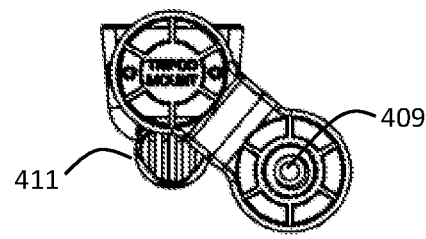
Figure 14E:
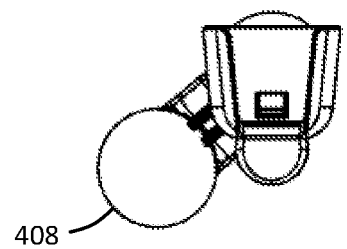
Figure 14F:
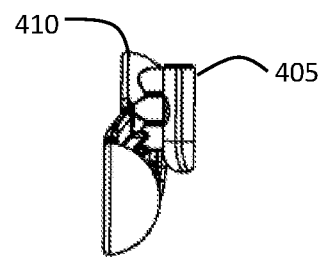
Figure 14G:
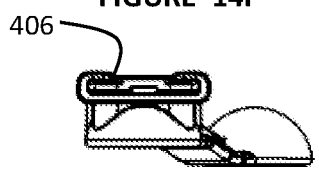
Figure 15A:
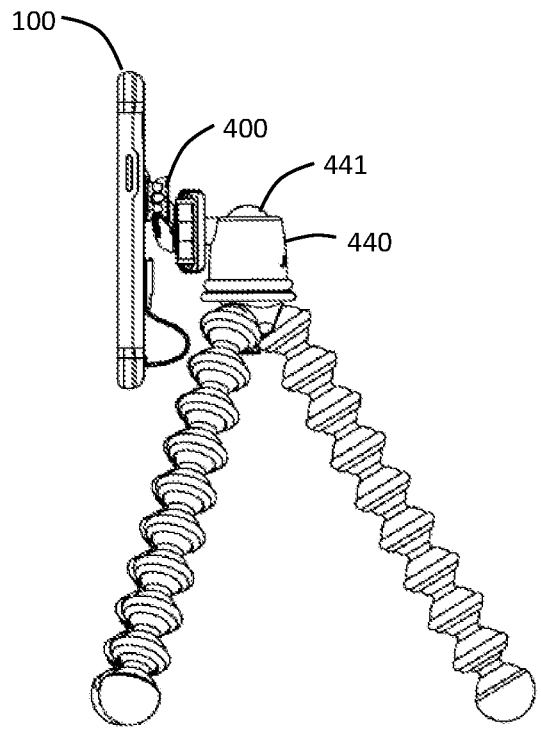
FIGS. 15A-F are views of an offset threaded adapter accessory coupling a device case to a tripod according to some embodiments of the present invention.
Figure 15B:
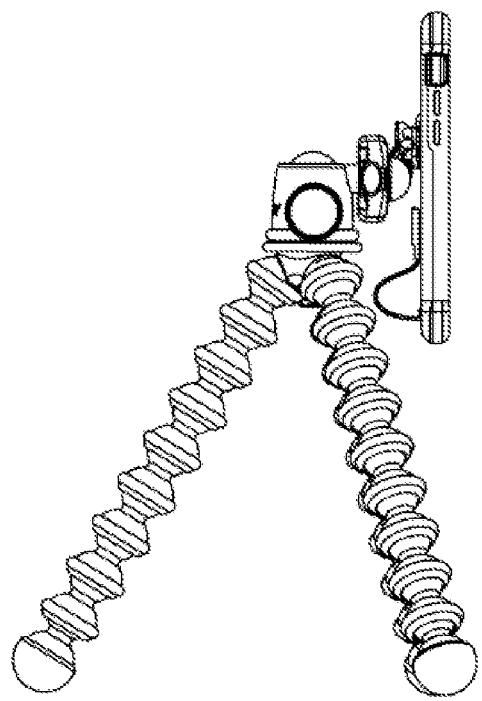
Figure 15C:
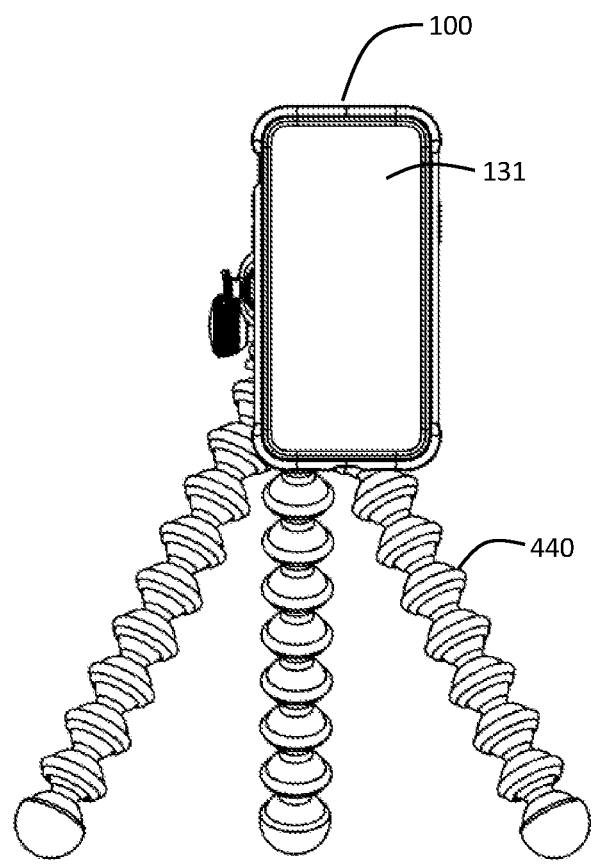
Figure 15D:
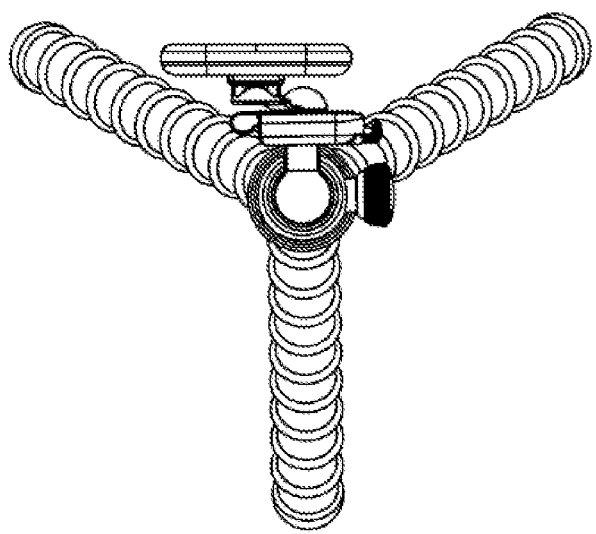
Figure 15E:
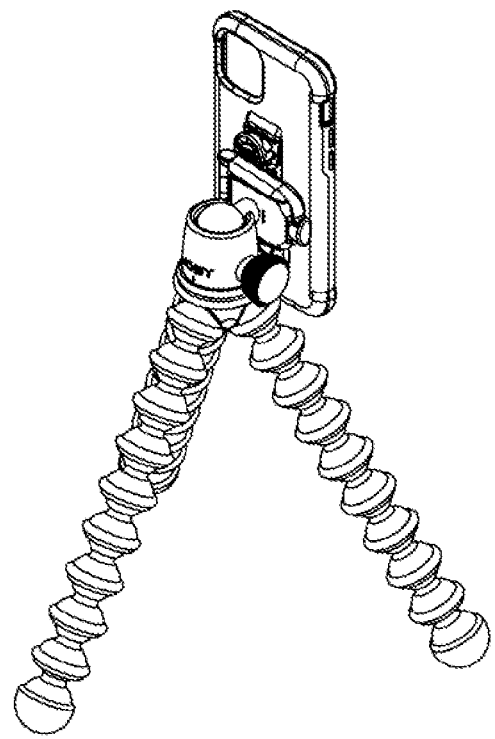
Figure 15F:
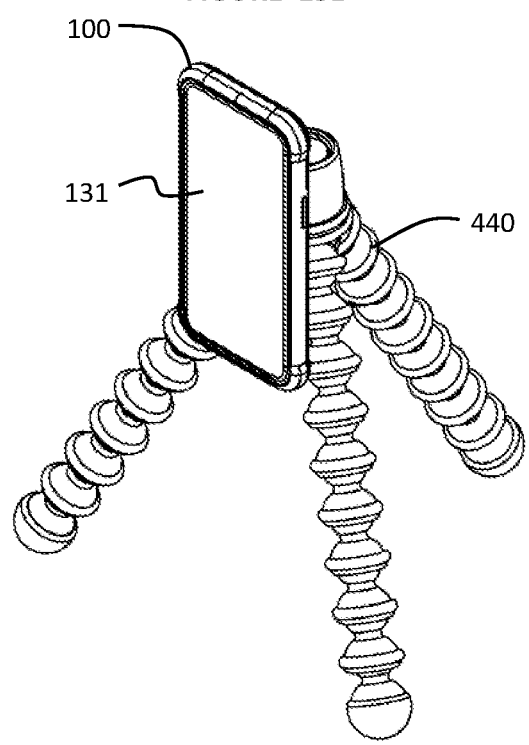

FIG. 14A illustrates an offset threaded adapter accessory 400 mounted onto a device case 100 according to some embodiments of the present invention. The offset threaded adapter may be used to bridge the device case to a threaded post interface, as may be seen with some support devices, such as tripods. FIGS. 14B-14G illustrate the offset threaded adapter accessory which includes a clip receiver 405 similar to that as seen above. A first body end 410 is structurally coupled to the clip receiver 405 and to an offset body portion 407. A second body end 408 is coupled to the offset body portion 407 and has a threaded insert 409 which allows the accessory 400 to be mounted onto a threaded post, as may be found on a tripod or other supports device. A release lever 411 may release the latch of the clip receiver when the user desires to disconnect the accessory from the device case.

FIGS. 15A-15F illustrate a cellular telephone 131 mounted in a device case 100 supported by an offset threaded adapter accessory mounted onto a tripod 440. The tripod 440 may have a spherical pivot 441 which allows for many different configurations of the system, giving the user numerous positions to select from for the held device.

Figure 16A:
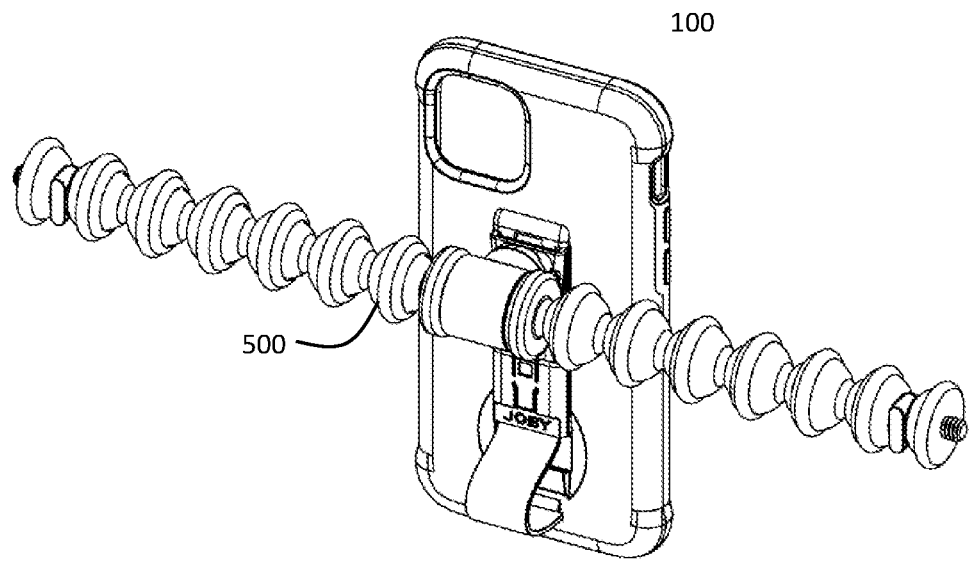
FIGS. 16A-G are views of dual flexible mounting arm accessory according to some embodiments of the present invention.
Figure 16B:
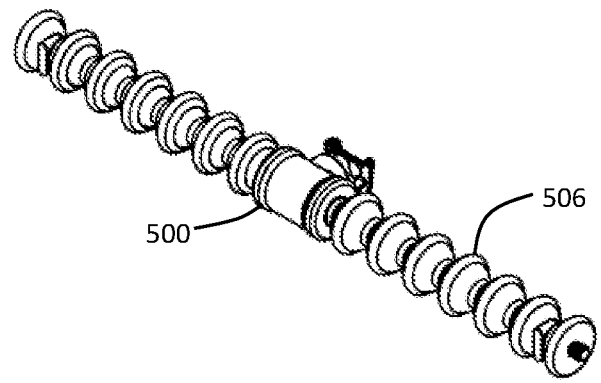
Figure 16C:
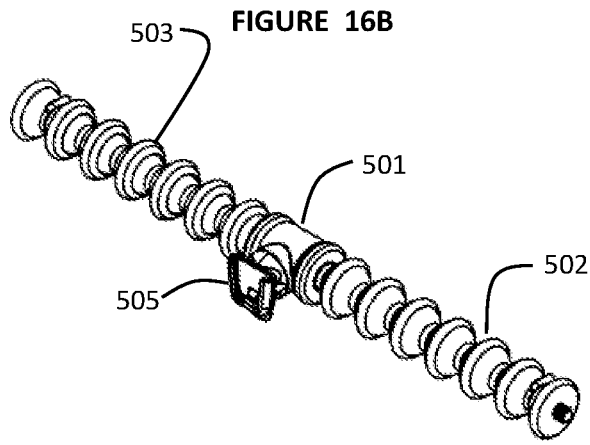
Figure 16D:
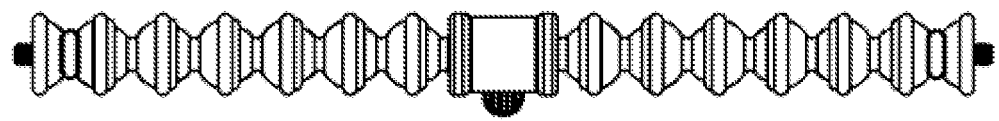
Figure 16E:
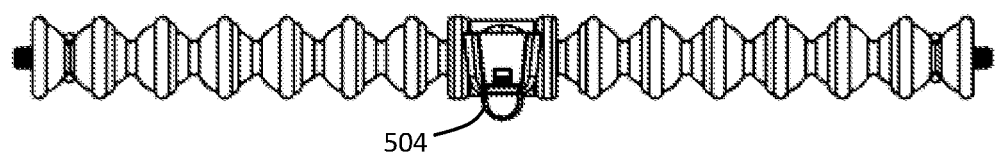
Figure 16F:
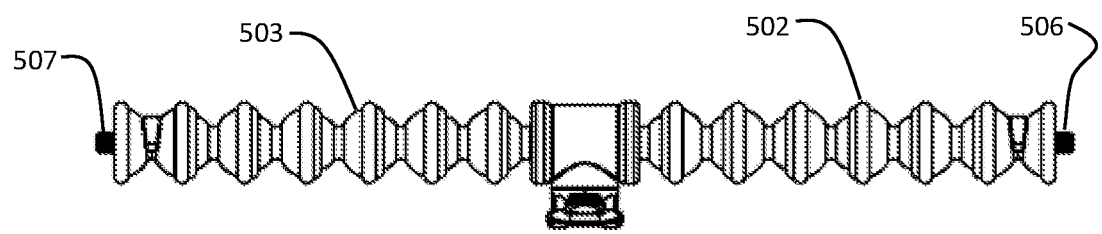
Figure 16G:

FIG. 16A illustrates a dual flexible mounting arm accessory 500 mounted onto a device case 100 according to some embodiments of the present invention. FIGS. 16B-16G illustrate the dual flexible mounting arm accessory 500 with a central body 501 coupled to a clip receiver 505. A first flexible arm 503 is coupled to a first side of the central body 501 and a second flexible arm 502 is coupled to a second side of the central body 501. A release lever 504 may release the latch of the clip receiver when the user desires to disconnect the accessory from the device case. Threaded posts 506, 507 are present on the ends of the flexible arms and may be used to support other equipment, as the user desires, such as lighting or other devices.

Figure 17A:
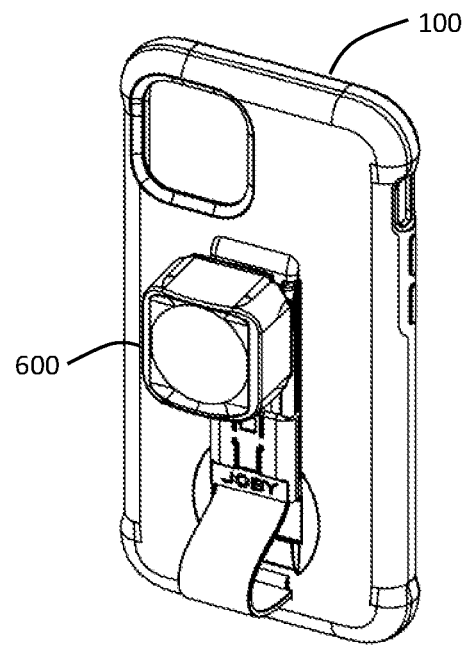
FIGS. 17A-G are views of a lighting accessory according to some embodiments of the present invention.
Figure 17B:
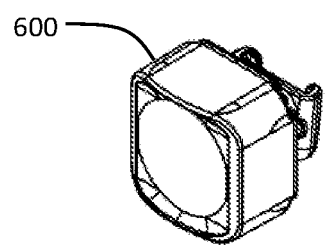
Figure 17C:
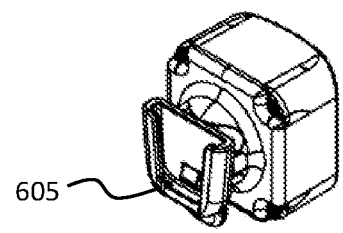
Figure 17D:
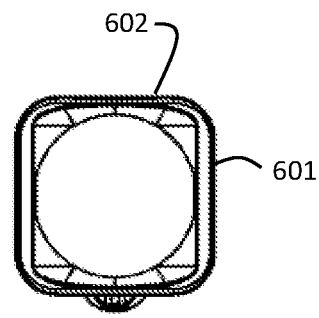
Figure 17E:
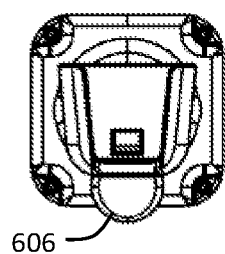
Figure 17F:
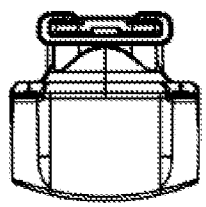
Figure 17G:
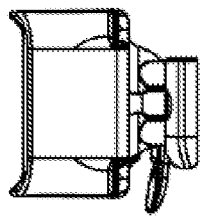

FIG. 17A illustrates a lighting accessory 600 mounted onto a device case 100 according to some embodiments of the present invention. FIGS. 17B-17G illustrate the lighting accessory 600 with a main body 601 coupled to a clip receiver 605. A release lever 606 may release the latch of the clip receiver when the user desires to disconnect the accessory from the device case. A light 602 is within the main body 601.

Figure 18A:
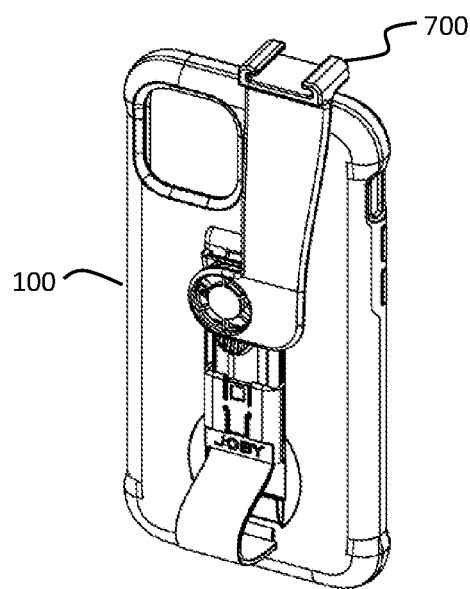
FIGS. 18A-G are views of an extension arm cold shoe accessory according to some embodiments of the present invention.
Figure 18B:
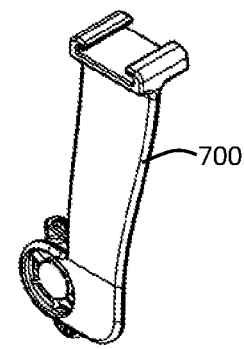
Figure 18C:
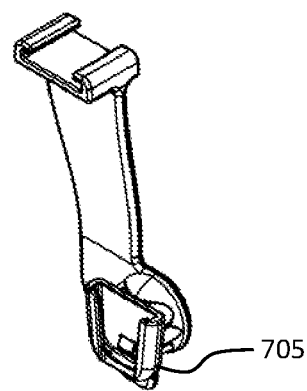
Figure 18D:
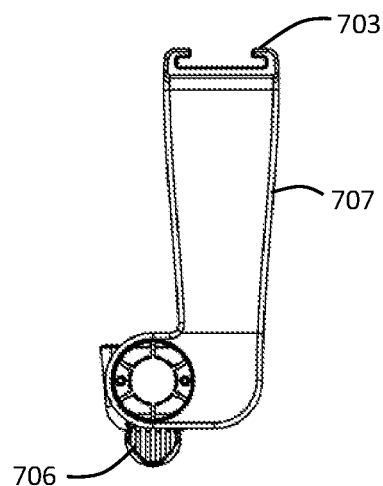
Figure 18E:
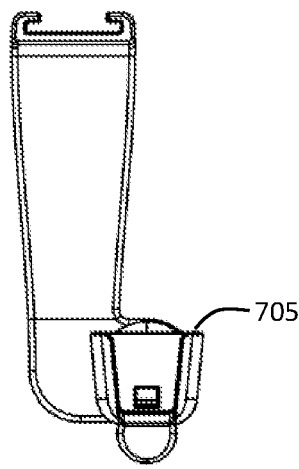
Figure 18F:
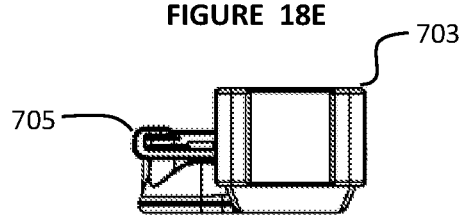
Figure 18G:
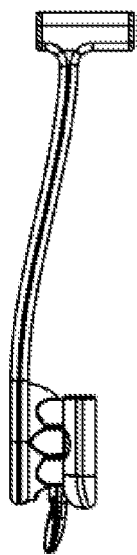

FIG. 18A illustrates an extension arm cold shoe accessory 700 mounted onto a device case 100 according to some embodiments of the present invention. FIGS. 18B-18G illustrate the extension arm cold shoe accessory 700 with an extension arm 707 coupled to a clip receiver 705. A release lever 706 may release the latch of the clip receiver when the user desires to disconnect the accessory from the device case. A cold shoe 703 resides at the far end of the extension arm 707, which may extend the location of the cold shoe 703 above the top of the case clip, for example.

Figure 19A:
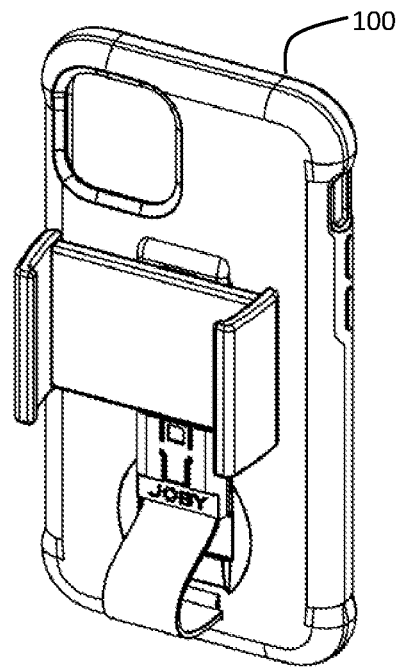
FIGS. 19A-C are views of a power bank clamp accessory according to some embodiments of the present invention.
Figure 19B:
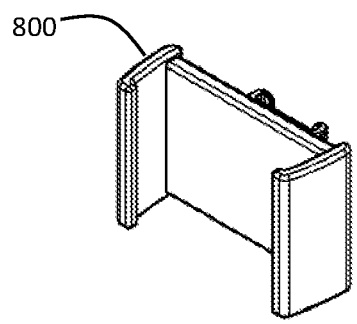
Figure 19C:
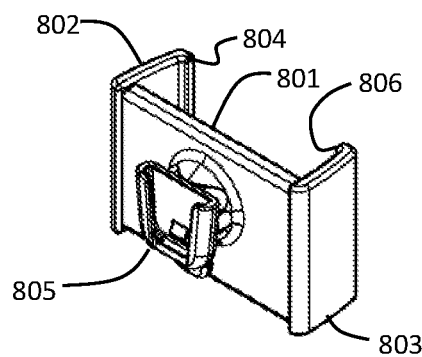

FIG. 19A illustrates a power bank clamp accessory 800 mounted onto a device case 100 according to some embodiments of the present invention. FIGS. 19B-19C illustrate the power bank clamp accessory 800 with a central body 801 coupled to a clip receiver 805. The central body 801 supports a first gripping arm 802 and a second gripping arm 803. Edge lips 804, 806 may grip or grab the device held, such as an auxiliary battery device. The clamp may be flexible enough to allow the gripping arms to be spread to allow for the insertion of the battery device, while sufficiently rigid to retain that battery device during expected use.

Figure 20A:
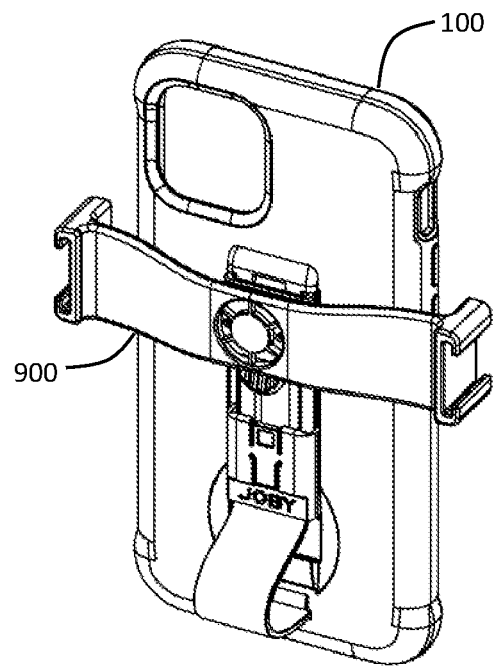
FIGS. 20A-G are views of a double cold shoe accessory according to some embodiments of the present invention.
Figure 20B:
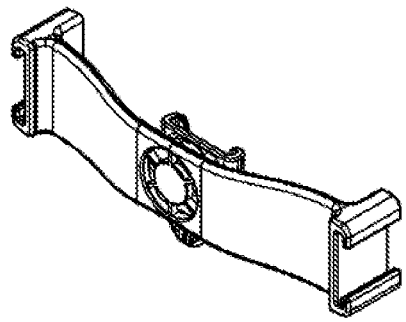
Figure 20C:
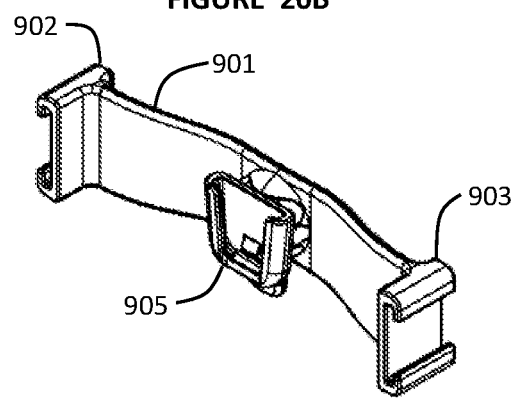
Figure 20D:
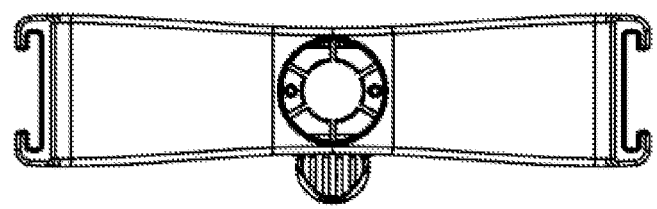
Figure 20E:
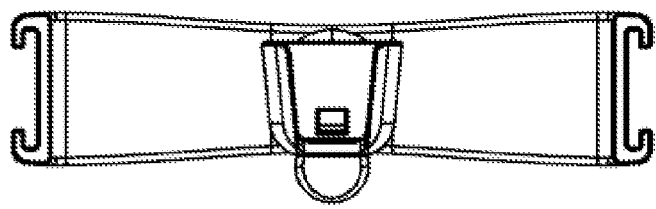
Figure 20F:
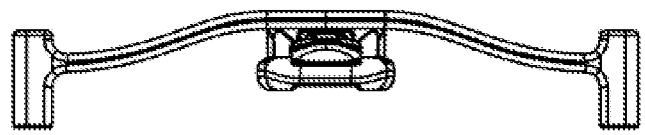
Figure 20G:
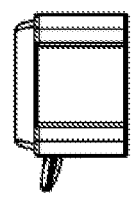

FIG. 20A illustrates a double cold shoe accessory 900 mounted onto a device case 100 according to some embodiments of the present invention. FIGS. 20B-20F illustrate the double cold shoe accessory 900 with a central body 901 coupled to a clip receiver 905. The central body 901 supports a first cold shoe 902 and a second cold shoe 903. The clamp may be sized such that the cold shoes are placed to the exterior of the sides of the device case 100. This configuration will allow the cold shoes to support cameras on both side of a cellular telephone mounted into the device case 100.

Figure 21A:
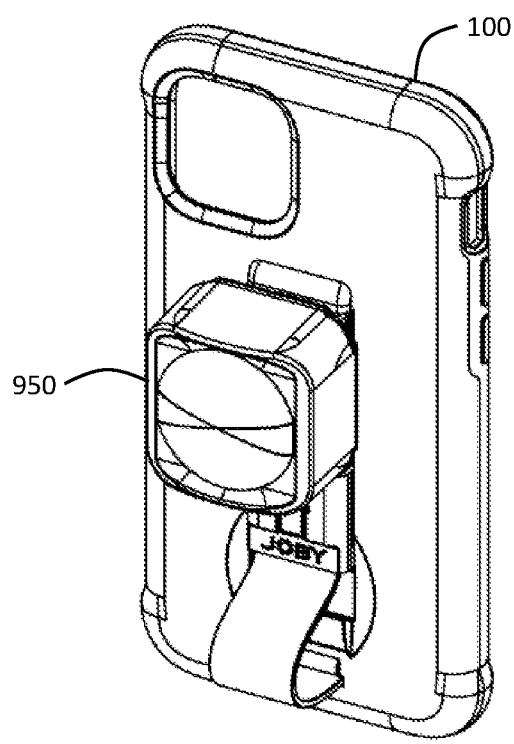
FIGS. 21A-G are views of a speaker accessory according to some embodiments of the present invention.
Figure 21B:
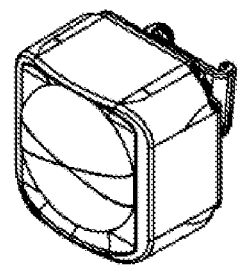
Figure 21C:
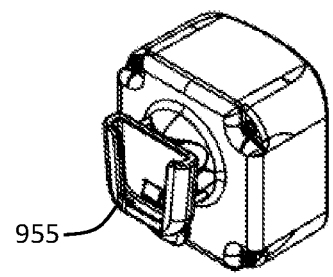
Figure 21D:
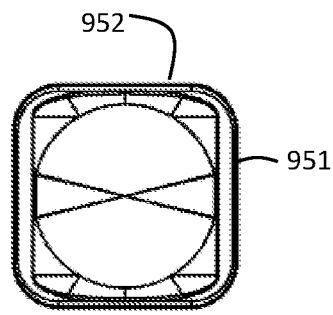
Figure 21E:
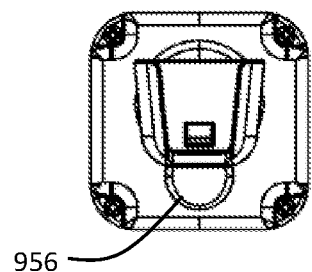
Figure 21F:
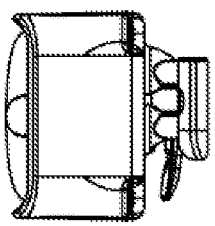
Figure 21G:
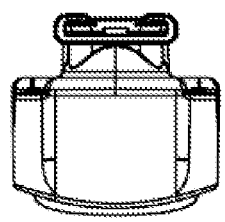

FIG. 21A illustrates a speaker accessory 950 mounted onto a device case 100 according to some embodiments of the present invention. FIGS. 21B-21G illustrate the speaker accessory 950 with a main body 951 coupled to a clip receiver 955. A release lever 956 may release the latch of the clip receiver when the user desires to disconnect the accessory from the device case. A speaker 952 is within the main body 951.

Figure 22A:
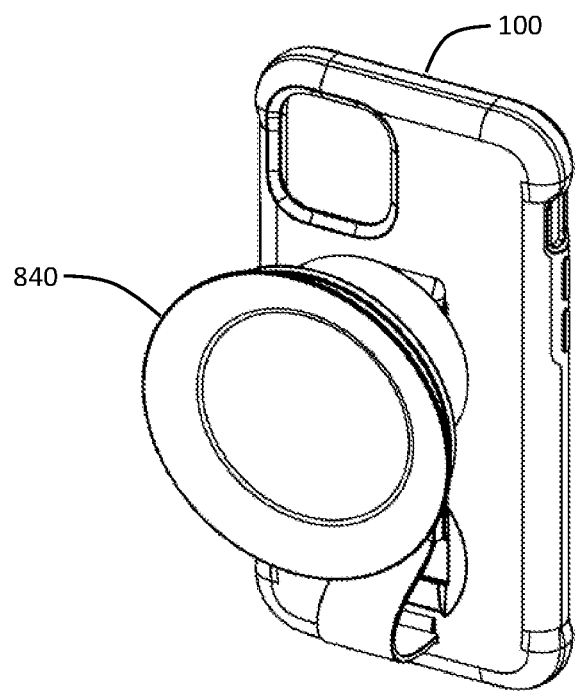
FIGS. 22A-F are views of a suction cup accessory according to some embodiments of the present invention.
Figure 22B:
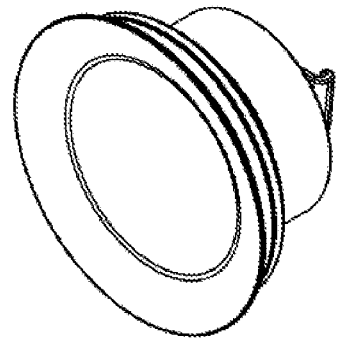
Figure 22C:
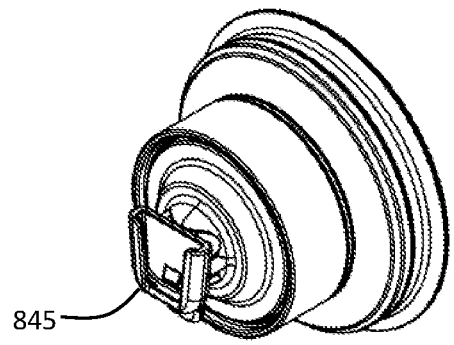
Figure 22D:
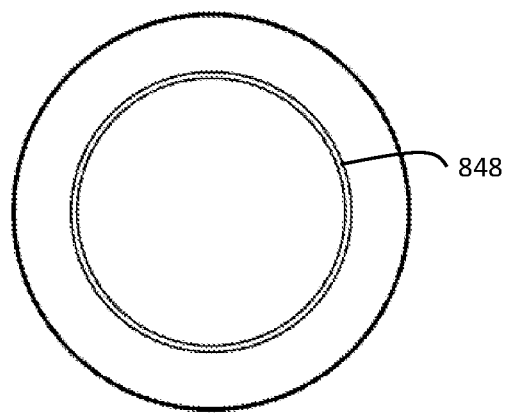
Figure 22E:
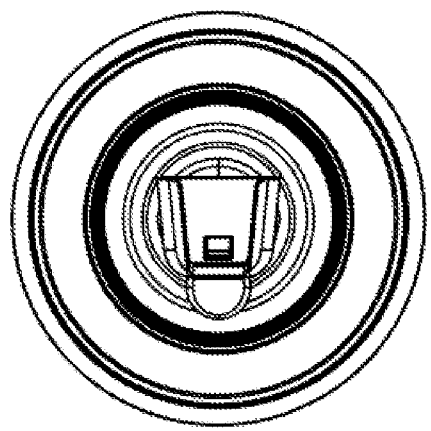
Figure 22F:
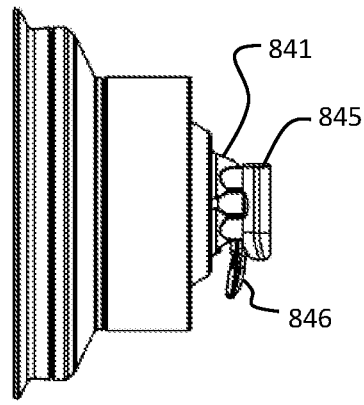

FIG. 22A illustrates a suction cup accessory 840 mounted onto a device case 100 according to some embodiments of the present invention. FIGS. 22B-22F illustrate the suction cup accessory 840 with a main body 841 coupled to a clip receiver 845. A release lever 846 may release the latch of the clip receiver when the user desires to disconnect the accessory from the device case. A suction cup 848 is coupled to the main body 841.

Figure 23A:
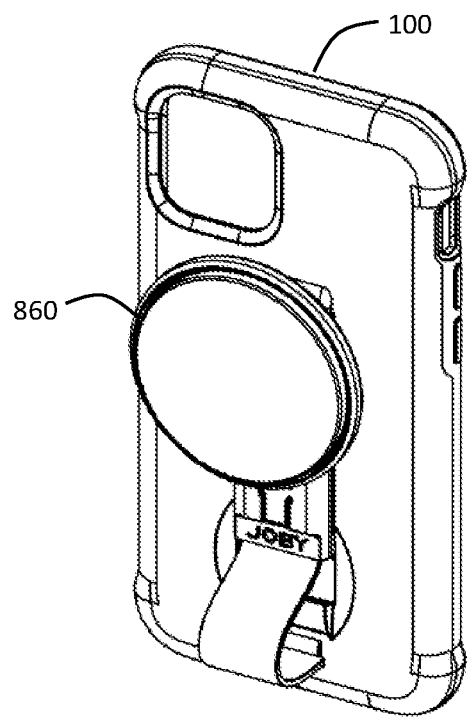
FIGS. 23A-G are views of a nano-suction cup accessory according to some embodiments of the present invention.
Figure 23B:
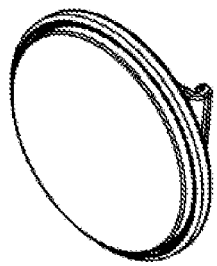
Figure 23C:
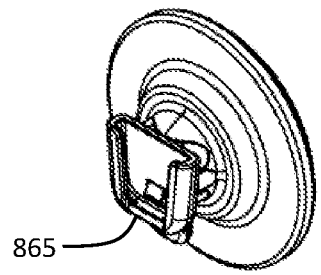
Figure 23D:
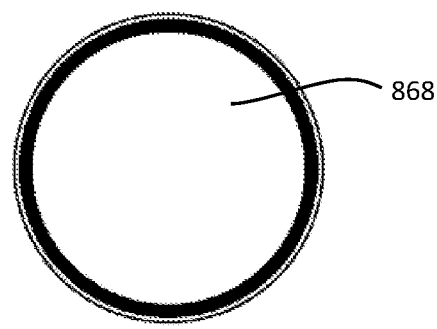
Figure 23E:
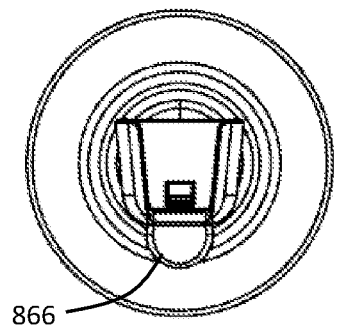
Figure 23F:
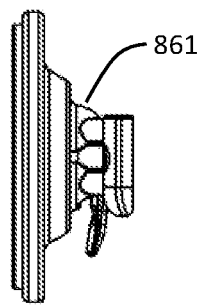
Figure 23G:
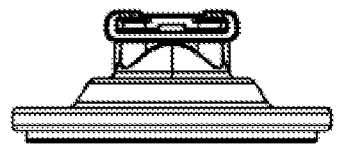

FIG. 23A illustrates a nano-suction cup accessory 860 mounted onto a device case 100 according to some embodiments of the present invention. FIGS. 23B-23G illustrate the nano-suction cup accessory 860 with a main body 861 coupled to a clip receiver 865. A release lever 866 may release the latch of the clip receiver when the user desires to disconnect the accessory from the device case. A nano-suction cup 868 is coupled to the main body 861.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A device case with strap, said device case with strap comprising:
    a main case, said main case comprising:
        a central panel; said central panel comprising a first side and a second side;
        a rim around said central panel extending from said first side of said central panel, said rim and said central panel defining a space on said first side of said panel adapted to receive an electronic device;
    a case clip coupled to said second side of said main case; and
    a clip slider coupled to said case clip; said clip slider adapted to slide along said case clip; and
    a strap coupled to said main case on a first end and coupled to said clip slider on a second end.

2. The device case with strap of claim 1 wherein said clip slider comprises a clip receiver, and wherein said case clip comprises a clip plate, wherein said clip plate is releasably latched to said clip receiver with a latch when said case slider is in a closed position.

3. The device case with strap of claim 2 wherein said case clip comprises one or more guide slots, and wherein said clip slider comprises one or more rails adapted to slide within said guide slots.

4. The device case with strap of claim 1 wherein said strap is bowed out away from said central panel when said clip slider is in an open configuration.

5. The device case with strap of claim 2 wherein said strap is bowed out away from said central panel when said clip slider is in an open configuration.

6. The device case with strap of claim 2 wherein said case clip comprises a push tab and a latch coupled to push tab, wherein said latch fits into a recess in said clip plate when said case clip is in a latched configuration.

7. The device case with strap of claim 2 further comprising a flexible leg attachment accessory, said flexible leg attachment accessory comprising a clip receiver and two flexible legs, said clip receiver adapted to latch onto said clip plate of said device case.

8. The device case with strap of claim 7 wherein said legs of said flexible leg attachment accessory comprise a metal core surrounded by a resilient compound.

9. The device case with strap of claim 7 wherein said legs of said flexible leg attachment accessory comprise ball and socket connectors.

10. The device case with strap of claim 2 further comprising a cold shoe attachment accessory, said cold shoe attachment accessory comprising:
    a cold shoe;
    a clip receiver; and
    an extension arm coupled to said cold shoe on a first end and coupled to said clip receiver on a second end, wherein said cold shoe resides further from said clip receiver than an adjacent portion of said rim of said device case.

11. An attachable strap device, said attachable strap device comprising:
    a main structure, said main structure comprising a first side and a second side;
    a case clip coupled to said second side of said main structure;
    a clip slider coupled to said case clip; said clip slider adapted to slide along said case clip; and
    a strap coupled to said second side of said main structure on a first end and coupled to said clip slider on a second end.

12. The attachable strap device of claim 11 wherein said clip slider comprises a clip receiver, and wherein said case clip comprises a clip plate, wherein said clip plate is releasably latched to said clip receiver with a latch when said case slider is in a closed position.

13. The attachable strap device of claim 12 wherein said case clip comprises one or more guide slots, and wherein said clip slider comprises one or more rails adapted to slide within said guide slots.

14. The attachable strap device of claim 11 wherein said strap is bowed out away from said main structure when said clip slider is in an open configuration.

15. The attachable strap device of claim 12 wherein said strap is bowed out away from said main structure when said clip slider is in an open configuration.

16. The attachable strap device of claim 12 wherein said case clip comprises a push tab and a latch coupled to push tab, wherein said latch fits into a recess in said clip plate when said case clip is in a latched configuration.

17. The attachable strap device of claim 12 further comprising a flexible leg attachment accessory, said flexible leg attachment accessory comprising a clip receiver and two flexible legs, said clip receiver adapted to latch onto said clip plate of said device case.

18. The attachable strap device of claim 17 wherein said legs of said flexible leg attachment accessory comprise a metal core surrounded by a resilient compound.

19. The attachable strap device of claim 17 wherein said legs of said flexible leg attachment accessory comprise ball and socket connectors.

20. The attachable strap device of claim 12 further comprising a cold shoe attachment accessory, said cold shoe attachment accessory comprising:
    a cold shoe;
    a clip receiver; and an extension arm coupled to said cold shoe on a first end and coupled to said clip receiver on a second end.

\* \* \* \* \*